United States Patent
Haff et al.

(10) Patent No.: US 9,626,655 B2
(45) Date of Patent: Apr. 18, 2017

(54) METHOD, APPARATUS AND SYSTEM FOR REGULATING ELECTRONIC MAIL

(75) Inventors: Maurice W. Haff, Easton, MD (US);
Christopher S. Fahey, Denton, MD (US); Daniel B. Curtis, Easton, MD (US); Michael J. Larson, Queenstown, MD (US); Christopher D. Clarke, Annapolis, MD (US)

(73) Assignee: INTELLECTUAL VENTURES I LLC, Wilmington, DE (US)

( * ) Notice: Subject to any disclaimer, the term of this patent is extended or adjusted under 35 U.S.C. 154(b) by 2741 days.

(21) Appl. No.: 11/058,396

(22) Filed: Feb. 16, 2005

(65) Prior Publication Data
US 2005/0193075 A1 Sep. 1, 2005

Related U.S. Application Data

(60) Provisional application No. 60/545,473, filed on Feb. 19, 2004.

(51) Int. Cl.
| | |
|---|---|
| G06F 15/16 | (2006.01) |
| G06Q 10/10 | (2012.01) |
| H04L 29/06 | (2006.01) |
| G06F 15/173 | (2006.01) |

(52) U.S. Cl.
CPC .......... *G06Q 10/107* (2013.01); *H04L 63/08* (2013.01); *H04L 63/0823* (2013.01)

(58) Field of Classification Search
USPC .............................. 709/206; 12/585, 58, 581
See application file for complete search history.

(56) References Cited

U.S. PATENT DOCUMENTS

| | | | |
|---|---|---|---|
| 5,739,512 A | 4/1998 | Tognazzini | |
| 5,915,022 A | 6/1999 | Robinson et al. | |
| 5,999,967 A | 12/1999 | Sundsted | |
| 6,005,945 A | * 12/1999 | Whitehouse | ............... 380/51 |
| 6,029,887 A | 2/2000 | Furuhashi et al. | |

(Continued)

OTHER PUBLICATIONS

"EPM Interface Standard," Universal Pasta! Union in a draft Publication, Sep. 29, 2003.

(Continued)

*Primary Examiner* — Chris Parry
*Assistant Examiner* — Alan S Chou
(74) *Attorney, Agent, or Firm* — Schwabe, Williamson & Wyatt

(57) ABSTRACT

A Postal Authority regulated e-Mail messaging application is provided over a public network to a plurality of mailers and addressees using authenticated transaction records. The application transmits at least one e-Mail message through at least one e-Mail account configured for a specific class of service. The application creates transaction records relevant to the specific class of service based upon details of completed transactions. Electronic postmarks are obtained to authenticate transaction records. Authenticated transaction records are sent to the mailer. A unique identifier of an electronic postmark is embedded in the e-Mail message. The e-Mail message incorporating the unique identifier is sent to at least one addressee. Authenticated e-Mail messages and transaction records are created and protected from undetectable modification.

49 Claims, 6 Drawing Sheets

(56) References Cited

U.S. PATENT DOCUMENTS

| | | | |
|---|---|---|---|
| 6,185,683 B1 | 2/2001 | Ginter | |
| 6,219,669 B1 | 4/2001 | Haff et al. | |
| 6,236,972 B1 | 5/2001 | Shkedy | |
| 6,260,024 B1 | 7/2001 | Shkedy | |
| 6,442,571 B1 | 8/2002 | Haff et al. | |
| 6,560,581 B1 | 5/2003 | Fox et al. | |
| 6,917,948 B2 | 7/2005 | Campbell | |
| 7,206,820 B1* | 4/2007 | Rhoads et al. | 709/217 |
| 2001/0037453 A1* | 11/2001 | Mitty et al. | 713/168 |
| 2002/0029248 A1 | 3/2002 | Cook et al. | |
| 2002/0029249 A1* | 3/2002 | Campbell et al. | 709/206 |
| 2002/0029279 A1 | 3/2002 | Campbell et al. | |
| 2002/0184224 A1 | 12/2002 | Haff et al. | |
| 2003/0074411 A1 | 4/2003 | Nale | |
| 2003/0191969 A1* | 10/2003 | Katsikas | 713/201 |
| 2004/0049515 A1 | 3/2004 | Haff et al. | |
| 2004/0199585 A1* | 10/2004 | Wang | 709/206 |
| 2010/0332839 A1* | 12/2010 | Dare et al. | 713/175 |
| 2011/0246588 A1* | 10/2011 | Tomkow | 709/206 |

OTHER PUBLICATIONS

"S/MIME—S/MIME Version 2 Message Specification (RFC2311)," http://www.ietf.org/rfc/rfc3211.txt, downloaded from the internet on May 10, 2005.

"MIME—Multipurpose Internet Mail Extensions (RFC2045)," http://www.faqs.org/rfcs/rfc2045.html, downloaded from the Internet on May 10, 2005.

"EPM—USPS Electronic Postmark," http://www.usps.com/electronicpostmark/welcome.htm, downloaded from the Internet on May 10, 2005.

U.S. Appl. No. 10/844,387 to Haff et al., filed May 13, 2004.

International Search Report dated Jun. 15, 2005 for Appln. No. PCT/US04/15369.

IPRP dated Nov. 18, 2005 for Appln. No. PCT/US04/15369.

International Search Report dated Aug. 25, 2006 for Appln. No. PCT/US05/05396.

IPRP dated Nov. 10, 2006 for Appln. No. PCT/US05/05396.

Office Action dated Aug. 31, 2005 for U.S. Appl. No. 10/844,387.

Office Action dated Feb. 27, 2006 for U.S. Appl. No. 10/844,387.

Office Action dated Dec. 14, 2007 for U.S. Appl. No. 10/844,387.

Office Action dated Aug. 19, 2008 for U.S. Appl. No. 10/844,387.

Office Action dated Mar. 25, 2009 for U.S. Appl. No. 10/844,387.

Office Action dated Sep. 30, 2009 for U.S. Appl. No. 10/844,387.

Office Action dated May 12, 2010 for U.S. Appl. No. 10/844,387.

"Canada Post—for Your Eyes Only—Press Release for PosteCS", Canada Post, Apr. 28, 2000.

Disappearing Cryptography: Information Hiding: Steganography & Watermarking, 2nd edition. Wayner, Peter. Morgan Kaufman Publishers, San Francisco, CA, 2002. ISBN 1-55860-769-2. pp. 165-167 included and cited.

"Extensible Markup Language (XML)", Working draft by W3C, Nov. 14, 1996.

How Computers Work, Millennium Edition, White, Ron. Que Publishing, Indianapolis, 1999. Chapters 1-9 and 14-31 included. ISBN 0-7897-2112-0.

How Networks Work. Derfler, Frank, and Les Freed. 2000, Que Publishing. ISBN: 0789724456. Chapter 17 included; entire book cited.

"Hypertext Transfer Protocol—HTTP/1.1", RFC 2616, The Internet Society, 1999.

"Prepare for Pet Emergencies at mypetsoft.com", Marketwatch.com, Aug. 13, 2008.

UDDI Version 2.04 API Specification. Jul. 19, 2002. UDDI.org. Entire Specification included and cited.

"US West Unveils TV-based Web Service", PC World, Nov. 24, 1999.

"XSL Transformations (XSLT) Version 1.0", W3C, Nov. 16, 1999. XSLT. Tidwell, Doug. 2001. O'Reilly Media. ISBN: 978-0-596-00053-0. Selections of Chapters 1,2,9, Appendix A included; entire book cited.

* cited by examiner

METHOD, APPARATUS AND SYSTEM FOR REGULATING ELECTRONIC MAIL

CROSS REFERENCE TO RELATED APPLICATIONS

This application is based on and claims the benefit of the filing date of U.S. provisional application Ser. No. 60/545,473, filed Feb. 19, 2004, and incorporated herein by reference in its entirety.

REFERENCE TO COMPUTER PROGRAM LISTING APPENDIX

Six computer program listing Appendices on compact disc-read only memory (CD-ROM), containing Appendices 1-6 that correspond to portions of sections 1-6 referenced in the present specification, are filed herewith, in accordance with 37 C.F.R. §1.52(e). The computer program listing Appendices are incorporated by reference in their entirety, in accordance with 37 C.F.R. §1.77(b)(4). Each of the Appendices was created on Jan. 26, 2005. The computer program listing Appendices are identified as follows

| Name | Size | Type |
| --- | --- | --- |
| P26560APPENDIX1 | 7,502 bytes | Text Document |
| P26560APPENDIX2 | 7,614 bytes | Text Document |
| P26560APPENDIX3 | 9,331 bytes | Text Document |
| P26560APPENDIX4 | 1,923 bytes | Text Document |
| P26560APPENDIX5 | 1,250 bytes | Text Document |
| P26560APPENDIX6 | 10,957 bytes | Text Document |

A portion of the disclosure of this patent document contains material that is subject to copyright protection. The copyright owner has no objection to the facsimile reproduction by anyone of the patent document or the patent disclosure, as it appears in the Patent and Trademark Office patent file records, but otherwise reserves all copyright rights whatsoever.

BACKGROUND OF THE INVENTION

1. Field of the Invention

The present invention relates to the field of electronic commerce conducted over public computer networks, and more particularly to regulating electronic mail using Postal Authority electronic postmarking.

2. Description of Related Art

Electronic mail (e-Mail) has grown in popularity and is widely used for both private and commercial communication. The growth in popularity derives largely from its ease of use, fast delivery, and low cost. Standardization and interoperability among e-Mail systems serves to provide a supporting infrastructure that is widely deployed. Many users consider e-Mail to be the electronic equivalent of paper-based letters and other forms of postal mail. While there are some common traits, in reality e-Mail is not the electronic equivalent of postal mail. Current e-Mail services lack the legal and regulatory framework that protects users of physical mail.

Further, e-Mail is typically promoted as a "free" service. In reality, e-Mail is not free. The cost to organizations that use e-Mail or provide e-Mail services has grown dramatically with the rise in popularity. More than half the rising cost can be attributed to the growth in unsolicited commercial e-Mail widely known as "SPAM," originating from both legitimate and illegitimate sources.

Both technical and legislative solutions to the "SPAM problem" have been offered. Technical solutions typically involve blocking or filtering. Technical problems have proven to be only partly effective for target recipients, while having a disastrous impact on legitimate commercial advertisers that use "direct" e-Mail marketing. Further, blocking and filtering often result in undelivered legitimate business communications, and can have a serious detrimental impact on emergency e-Mail message communications. Legislative solutions such as the "CAN-SPAM" Act passed into law in the United States, and similar laws around the world, typically involve measures to establish norms of unlawful conduct and enforcement mechanisms. The effectiveness of measures such as these is not yet known. The ability to enforce such measures is not yet proven. Industry analysts question the effectiveness as well. According to an Internet Commentary entitled "Spammers must pay" by Jim Nail of Forrester Research, special to CNET News.com:

"Current technical and legislative solutions—like the CAN-SPAM Act of 2003—can, at best, only slow the flood of SPAM. The only permanent solution to the SPAM problem is to charge for email."

Forrester Research proposes an association run e-Mail payment system, where large and small ISPs, marketers and e-Mail marketing services companies would be association member-owners. A governance board would establish the technology standards, set the rate marketers would pay for e-Mail and oversee the registries' operations. This approach also lacks substantive enforcement mechanisms.

The "charge for e-Mail" approach to the SPAM problem typically is to require commercial advertisers that use e-Mail to pay for the service. For example, Goodmail Systems, Inc. of Mountain View, Calif. has proposed a system of paid stamps based on the teachings of Sundsted (U.S. Pat. No. 5,999,967) through which fees would be collected. Sundsted teaches a technique of filtering based on the value of an electronic stamp applied by the sender to an e-Mail message, the value (price to be paid by the sender) of which is predicated on agreement between the sender and intended receiver. This is combined with a mechanism for rating the value of the message content and charging the mailer accordingly. If the "stamp value" is greater than a predetermined amount established by the recipient, the e-Mail message is accepted and the sender is charged accordingly.

Goodmail Systems, Inc. discloses on their Web site (goodmail.com):

"Senders of volume email attach paid stamps to their outgoing messages. These encrypted stamps include verification of the sender's identity and require the sender to honor a "trusted unsubscribe" mechanism enforced by Goodmail Systems. In return, participating ISPs provide safe passage of stamped mail to recipients, thereby eliminating false positives and allowing legitimate mass mailers to interact with consumers in a reliable, trusted manner."

The teachings of Sundsted as applied by Goodmail Systems, Inc. lack substantive enforcement mechanisms and may require extensive modification to client-side software. Both factors represent significant obstacles to adoption and implementation. Further, the addition of an "e-stamp" as taught by Sundsted may represent a significant increase in the relative size of e-Mail messages sent, translating into greatly increased bandwidth requirements and costs to ISPs and commercial mailers. If this were required of all legitimate direct marketers that use e-Mail, the cost would most likely be prohibitive. This may suppress SPAM, but would be destructive of legitimate e-commerce.

Because e-Mail is so widely used for both private and commercial communications, and is considered by many businesses including legitimate commercial advertisers to be "mission critical," a combination of technical, economic, and legislative solutions is required to address the needs of the stakeholders. Application of Postal Electronic Postmark (EPM) services to provide a range of opt-in, fee-based, "Postal e-Mail" services to mailers can serve the needs of individuals and businesses alike, while providing an economic disincentive to Spammers, and the legal and enforcement framework enjoyed by physical mail. Addressees will know that the e-Mail message has value to the mailer because they were willing to pay a Postal Authority for the mailing. Further, addressees will know that the level of identity proofing of the sender was sufficient to obtain a Trust Account through which payment for postmarking services is made. Message postmarking will provide strong message authentication and a definitive condition for selective acceptance of e-Mail messages by ISPs and enterprise e-Mail servers, significantly increasing the level of trust and delivery assurance. Payment of "Terminal Dues" to Internet Service Providers (ISPs) delivering Postal e-Mail to addressees will serve to promote cooperation and adoption by service providers. Payment of Terminal Dues may be structured on a transactional basis for each postmarked message delivered. Incentive fees may also be paid for information leading to the arrest and conviction of persons engaged in unlawful actions involving Postal e-Mail.

Postal administrations typically provide physical mail services that may be known as Standard Mail, First Class Mail, Certificates of Mailing, Delivery Confirmation, Certified Mail, Certified Restricted Delivery, and Registered Mail. Each of these classes of mail service afford the parties to a mail transaction certain benefits and legal protections, which benefits and protections may vary depending on the applicable national laws and regulations, as well as international agreements. Generally, national laws preclude interference and tampering with postal mail by third parties. National laws generally prohibit holding or destruction of postal mail by third parties without express written authorization given in advance by intended addressees. All of these physical mail services require payment of postage or service fees, in accordance with corresponding, pre-established fee schedules and agreements, to one or more postal administrations involved in providing the mail service purchased. In cross border transactions, National Postal Services share postage revenue for processing physical mail in accordance with bi-lateral agreements negotiated under the auspices of the Universal Postal Union (UPU), an organization of the United Nations. The delivering Post receives from the sending Post funds often referred to as "Terminal Dues."

Large volume use of postal mailing services by a mailer typically involves establishment of a Trust Account through which the mailer pays for mailing services provided by a Postal Service. Establishment of a Trust Account typically involves some level of identity authentication of the mailer by the Postal Service. Such identity authentication may include verification of physical mailing address, tax identification number, credit history, telephone number, as well as other knowledge-based information.

Standard Mail, sometimes referred to as "advertising mail", is defined for physical mail as mail matter not required to be mailed as First Class Mail. Mailers typically use Standard Mail to send:

Printed matter, flyers, circulars, advertising
Newsletters, bulletins, and catalogs First Class Mail is defined for physical mail as mailable matter characterized as the following:

Handwritten or typewritten material
Bills, statements of account or invoices, credit cards
Personal correspondence, personalized business correspondence
All matter sealed or otherwise closed against inspection.

First Class Mail is typically used for business correspondence, as well as personal correspondence for which the sender desires privacy.

Certificate of Mailing is defined for physical mail as a receipt that provides evidence of the date that your mail was presented to a Postal Service for mailing. It can only be purchased at the time of mailing. It is the only official record available that can demonstrate that an article was mailed. Certificates of Mailing are typically used for both First Class and Standard Mail, and are an attestation by the Postal Service that the article was submitted to the mail stream.

Delivery Confirmation is defined for physical mail as a service providing the date, Postal Code (e.g., ZIP Code), and the time the article was delivered by the Postal Service. If delivery was attempted, the date and time of attempted delivery is provided. Delivery Confirmation is typically used for certain types of First Class and Standard mail, and is an attestation by the Postal Service that the article was delivered.

Certified Mail is defined for physical mail as First Class Mail with certification of delivery. Certified Mail provides the sender with delivery information and attestation by the Postal Service that the article arrived at its destination. Further, Certified Mail provides a unique article number and a receipt stamped with the date of mailing. As an additional security feature, the recipient's signature is obtained at the time of delivery and a record is maintained by the Postal Service. For an additional fee, senders can request a copy of the signature record before or after delivery with Return Receipt. Certified Mail is typically used for small articles that can only be sent using First Class Mail.

Certified Restricted Delivery is defined for physical mail as Certified Mail for which only a specified person (or authorized agent) can receive a piece of mail. Certified Restricted Delivery is typically used for Certified Mail with Return Receipt service providing a postcard with the date of delivery and intended recipient's signature.

Registered Mail is defined for physical mail as mail containing valuable or irreplaceable items for which loss is insured through the Postal Service. Registered Mail is used for shipment of items that have intrinsic value, and typically provides a Certificate of Mailing, Delivery Confirmation, Restricted Delivery, and Return Receipt. Registered Mail service is characterized by a higher level of security in handling than any other form of mail service from point of mailing to point of delivery to an addressee.

SUMMARY OF THE INVENTION

The present invention is directed toward creating certain equivalent (with respect to existing physical mail) Postal Mail Services configured as electronic transactions using, e.g., standard e-Mail protocols, postmarked digital receipts, Web Receipt Services and Electronic Postmarking Services. By way of example, postmarked digital receipts are taught in U.S. Pat. No. 6,442,571, filed Oct. 24, 2000 and entitled "File Transfer System Using Dynamically Assigned Ports", as well as U.S. Pat. No. 6,219,669, filed Nov. 13, 1998, and entitled "File Transfer System Using Dynamically Assigned Ports". Exemplary Web Receipt services are taught in U.S. Provisional Application 60/470,867, filed May 16, 2003. Electronic Postmarking services may comply with standards set by the Universal Postal Union (UPU) in a draft publication (i.e., UPU AES TSB Statusl Submission), entitled "EPM Interface Standard", dated Sep. 29, 2003. The entire disclosures of U.S. Pat. Nos. 6,219,669 and 6,442,571, and U.S. Provisional Application No. 60/470,867, are hereby incorporated by reference as though set forth in full herein.

The present invention is directed toward affecting certain equivalent Postal Mail Services without adding or modifying client-side software where possible, and utilizing functionality commonly available in e-Mail client software. Incorporation of the computer programs of the present invention into e-Mail server software and Web servers is anticipated.

The present invention is directed toward application of the Electronic Postmark (EPM) in e-Mail services to provide transaction authentication and to affect a legal and technical framework for e-Mail services that addresses the SPAM problem, while protecting the interests of individuals and businesses alike. The EPM Interface Standard states "EPM is fundamentally a non-repudiation service of perceived value that postal customers can subscribe to and are willing to pay for." An EPM provides official date and time, as well as attestation by the postal administration as to the validity of a postmarked transaction. Each EPM has a unique serial number (S/N). The EPM and the EPM S/N as applied in the present invention can provide a definitive and sufficient condition for selective acceptance and validation of e-Mail messages.

The present invention is directed toward rationalizing in e-Mail services National Laws and regulations governing electronic postal mail transactions, which may vary by country. Because National Laws preclude unlawful use, interference, or tampering with postal mail by third parties, and because electronic transactions that use the EPM are construed by Postal Services as postal mail transactions, any unlawful use, interference or tampering with such transactions may be prohibited under laws governing postal transactions. In the United States, the U.S. Postal Service (USPS) received in 1998 a delegation of authority from the U.S. Attorney General to investigate and prosecute wire fraud committed in electronic transactions involving the USPS EPM. This is in addition to U.S. Postal Laws and regulations, as well as emerging State laws that may apply. Further, because National Laws generally prohibit the holding or destruction of postal mail by third parties without express written authorization given in advance by intended addressees, the holding or destruction of electronic transactions that use the EPM may be prohibited under postal laws. This would include filtering, blocking, and quarantine of electronic transactions (e.g., e-Mail messages) or any other interference by third parties.

The present invention is directed toward enabling definitive criteria for selectively accepting e-Mail messages and attachments at e-Mail servers without the need for content filtering, which filtering may result in "false positives" or "false negatives" and blockage of legitimate messages. In any case, message encryption has been known to render message content filters ineffective, generally resulting in messages being blocked by receiving e-Mail servers. Accordingly, the present invention may result in greater efficiency and reliability for communications that use encryption.

The present invention is directed toward enabling third-party authentication of e-Mail messages, whether or not the messages are encrypted, significantly enhancing delivery assurance for legitimate messages that have been so authenticated.

The present invention is directed toward enabling an application that may be invoked as a mail filter by an SMTP E-mail server. A primary function of the application is to act on behalf of the E-mail server as a Digital Signature Authority. Another primary function of the application is to act on behalf of the E-mail server as an issuer of Electronic E-mail Receipts (EER) containing U.S. Postal Service or other postal authority Electronic Postmarks (EPM). A further primary function of the application is to add an EER to an e-Mail message being routed by an SMTP e-Mail Server. The e-Mail message may be signed after the EER is added, after which a Certificate of Mailing or Delivery may be sent. A secondary function of the application is to verify authenticated e-Mail messages, to create and verify Certificates and to generate an XML document containing the results of the verification.

DETAILED DESCRIPTION OF PREFERRED EMBODIMENTS

Figure 1:
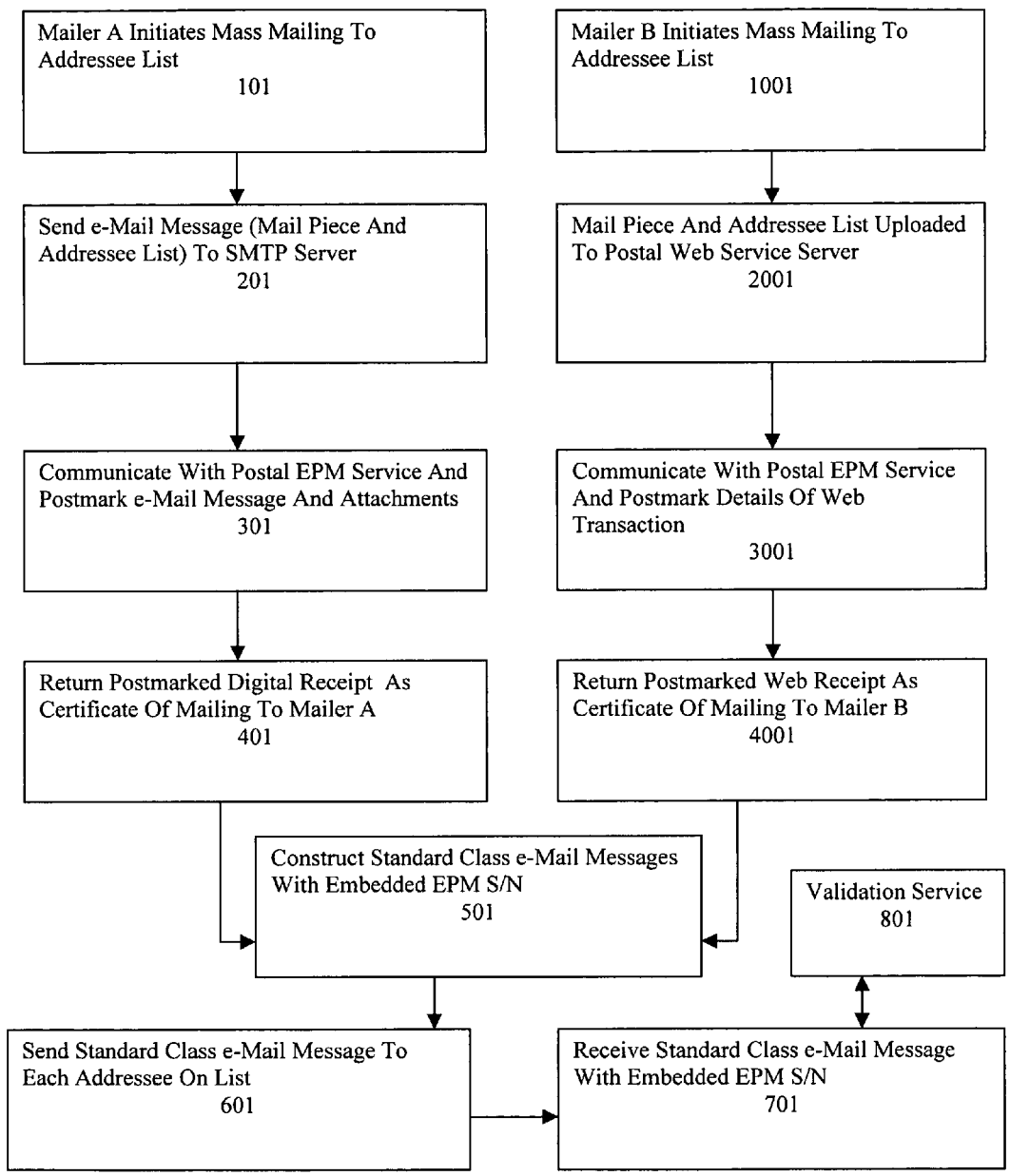
FIG. 1 is a flow chart showing a typical Standard e-Mail Service, according to the invention.

The following embodiments of the invention will be described in the context of what "Postal e-Mail Services" are, how such services work, how the services can be designed and constructed, and a description of typical service installations for use over the Internet. This invention's primary domain is Postal e-Mail Services and services related to events of mailing and delivery using Postal e-Mail Services. Therefore, this description is not directed to electronic mail message composition, storage or display; nor will it describe the methods and protocols required to carry out these functions. Such information is already widely available and understood by persons of ordinary skill in the art. Non-Postal e-Mail services (e.g., intra-organizational systems) are expressly contemplated as being within the scope of some embodiments of the invention.

According to an aspect of the present invention, a device provides a Postal Authority regulated e-Mail messaging application over a public network to a plurality of mailers and addressees using authenticated transaction records. The device transmits at least one e-Mail message through at least one e-Mail account configured for a specific class of service. The device creates transaction records relevant to a specific class of service based upon details of completed transactions. The device obtains electronic postmarks to authenticate transaction records and sends authenticated transaction records to the mailer. The device embeds a unique identifier of an electronic postmark in the e-Mail message, and sends to at least one addressee the e-Mail message incorporating the unique identifier. Authenticated e-Mail messages and transaction records are created and protected from undetectable modification.

According to another aspect of the present invention, each party may later present authenticated transaction records to the system for validation. The validation includes submitting the transaction record to a verifier and returning details of the verification to the presenting party.

According to another aspect of the present invention, the addressees' terminal e-Mail servers may selectively accept e-Mail messages subject to the presence of a unique identifier of an electronic postmark.

According to another aspect of the present invention, the e-Mail account is established for a mailer whose identity has been verified by one of a Postal Authority and an agent of the Postal Authority.

According to another aspect of the present invention, the unique identifier is the electronic postmark.

According to another aspect of the present invention, the unique identifier is a serial number for the corresponding electronic postmark.

According to another aspect of the present invention, the unique identifier is a graphical image in which the electronic postmark is embedded using stegonography.

According to another aspect of the present invention, the transaction record is a Certificate of Mailing providing proof that a message was submitted to an e-Mail server outside the control of the mailer.

According to another aspect of the present invention, the transaction record is a Certificate of Delivery providing proof that a message was delivered to an e-Mail system where the addressee is capable of receiving e-Mail.

According to another aspect of the present invention, the authenticated transaction record is embedded in the e-Mail message.

According to another aspect of the present invention, an authenticated transaction record is sent in conjunction with the corresponding e-Mail message to at least one addressee.

According to another aspect of the present invention, the e-Mail servers electronically sign e-Mail messages using a Digital Certificate issued to the server as a digital identity.

According to another aspect of the present invention, the regulated e-Mail messaging application is invoked as a mail filter from an SMTP mail server.

According to another aspect of the present invention, the unique identifier of the electronic postmark is embedded in a plurality of e-Mail messages.

According to still another aspect of the present invention, at least one e-Mail message containing the embedded unique identifier of the electronic postmark is sent to a plurality of addressees.

According to another aspect of the present invention, the mailing is preceded by delivery to an e-Mail system of at least one waybill listing the authenticated messages to be delivered to addressees having addresses at the e-Mail system.

According to an aspect of the present invention, a system provides a Postal Authority regulated e-Mail messaging application over a public network to a plurality of mailers and addressees using authenticated transaction records. The system transmits at least one e-Mail message through at least one e-Mail account configured for a specific class of service. The system creates transaction records relevant to the specific class of service based upon details of completed transactions. The system obtains electronic postmarks to authenticate transaction records and sends authenticated transaction records to the mailer. The system embeds a unique identifier of an electronic postmark in the e-Mail message, and sends to at least one addressee the e-Mail message incorporating the unique identifier. Authenticated e-Mail messages and transaction records are created and protected from undetectable modification.

According to another aspect of the present invention, each party may later present authenticated transaction records for validation, the validation including submitting the transaction record to a verifier and returning details of the verification to the presenting party.

According to another aspect of the present invention, the addressees' terminal e-Mail servers may selectively accept e-Mail messages subject to the presence of a unique identifier of an electronic postmark.

According to another aspect of the present invention, the e-Mail account is established for a mailer whose identity has been verified by one of a Postal Authority and an agent of the Postal Authority.

According to another aspect of the present invention, the unique identifier is the electronic postmark.

According to another aspect of the present invention, the unique identifier is a serial number for the corresponding electronic postmark.

According to another aspect of the present invention, the unique identifier is a graphical image in which the electronic postmark is embedded using stegonography.

According to another aspect of the present invention, the transaction record is a Certificate of Mailing providing proof that a message was submitted to an e-Mail server outside the control of the mailer.

According to another aspect of the present invention, the transaction record is a Certificate of Delivery providing proof that a message was delivered to an e-Mail system where the addressee is capable of receiving e-Mail.

According to another aspect of the present invention, the authenticated transaction record is embedded in the e-Mail message.

According to another aspect of the present invention, an authenticated transaction record is sent in conjunction with the corresponding e-Mail message to at least one addressee.

According to another aspect of the present invention, wherein the e-Mail servers electronically sign e-Mail messages using a Digital Certificate issued to the server as a digital identity.

According to another aspect of the present invention, the regulated e-Mail messaging application is invoked as a mail filter from an SMTP mail server.

According to another aspect of the present invention, the unique identifier of the electronic postmark is embedded in a plurality of e-Mail messages.

According to still another aspect of the present invention, at least one e-Mail message containing the embedded unique identifier of the electronic postmark is sent to a plurality of addressees.

According to another aspect of the present invention, the mailing is preceded by delivery to an e-Mail system of at least one waybill listing the authenticated messages to be delivered to addressees having addresses at the e-Mail system.

According to another aspect of the present invention, a computer readable medium stores a Postal Authority regulated e-Mail messaging application operated over a public network for a plurality of mailers and addressees using authenticated transaction records. The medium includes at least one source code segment. The source code segment(s) transmits at least one e-Mail message through at least one e-Mail account configured for a specific class of service. The source code segment(s) creates transaction records relevant to the specific class of service based upon details of completed transactions. The source code segment(s) obtains electronic postmarks to authenticate transaction records and sends authenticated transaction records to the mailer. The source code segment(s) embeds a unique identifier of an electronic postmark in the e-Mail message, and sends to at least one addressee the e-Mail message incorporating the unique identifier. Authenticated e-Mail messages and transaction records are created and protected from undetectable modification.

According to another aspect of the present invention, each party may later present authenticated transaction records to the application for validation, the validation including submitting the transaction record to a verifier and returning details of the verification to the presenting party.

According to another aspect of the present invention, the addressees' terminal e-Mail servers may selectively accept e-Mail messages subject to the presence of a unique identifier of an electronic postmark.

According to another aspect of the present invention, the e-Mail account is established for a mailer whose identity has been verified by one of a Postal Authority and an agent of the Postal Authority.

According to another aspect of the present invention, the unique identifier is the electronic postmark.

According to another aspect of the present invention, the unique identifier is a serial number for the corresponding electronic postmark.

According to another aspect of the present invention, the unique identifier is a graphical image in which the electronic postmark is embedded using stegonography.

According to another aspect of the present invention, the transaction record is a Certificate of Mailing providing proof that a message was submitted to an e-Mail server outside the control of the mailer.

According to another aspect of the present invention, the transaction record is a Certificate of Delivery providing proof that a message was delivered to an e-Mail system where the addressee is capable of receiving e-Mail.

According to another aspect of the present invention, the authenticated transaction record is embedded in the e-Mail message.

According to another aspect of the present invention, an authenticated transaction record is sent in conjunction with the corresponding e-Mail message to at least one addressee.

According to another aspect of the present invention, the e-Mail servers electronically sign e-Mail messages using a Digital Certificate issued to the server as a digital identity.

According to another aspect of the present invention, the regulated e-Mail messaging application is invoked as a mail filter from an SMTP mail server.

According to another aspect of the present invention, the unique identifier of the electronic postmark is embedded in a plurality of e-Mail messages.

According to still another aspect of the present invention, at least one e-Mail message containing the embedded unique identifier of the electronic postmark is sent to a plurality of addressees.

According to another aspect of the present invention, the mailing is preceded by delivery to an e-Mail system of at least one waybill listing the authenticated messages to be delivered to addressees having addresses at the e-Mail system.

According to an aspect of the present invention, a method provides a Postal Authority regulated e-Mail messaging application over a public network to a plurality of mailers and addressees using authenticated transaction records. The method includes transmitting at least one e-Mail message through at least one e-Mail account configured for a specific class of service. The method also includes creating transaction records relevant to the specific class of service based upon details of completed transactions. The method also includes obtaining electronic postmarks to authenticate transaction records and sending authenticated transaction records to the mailer. The method also includes embedding a unique identifier of an electronic postmark in the e-Mail message, and sending to at least one addressee the e-Mail message incorporating the unique identifier. Authenticated e-Mail messages are created and protected from undetectable modification.

According to another aspect of the present invention, each party may later present authenticated transaction records for validation, the validation including submitting the transaction record to a verifier and returning details of the verification to the presenting party.

According to another aspect of the present invention, the addressees' terminal e-Mail servers may selectively accept e-Mail messages subject to the presence of a unique identifier of an electronic postmark.

According to another aspect of the present invention, the e-Mail account is established for a mailer whose identity has been verified by one of a Postal Authority and an agent of the Postal Authority.

According to another aspect of the present invention, the unique identifier is the electronic postmark.

According to another aspect of the present invention, the unique identifier is a serial number for the corresponding electronic postmark.

According to another aspect of the present invention, the unique identifier is a graphical image in which the electronic postmark is embedded using stegonography.

According to another aspect of the present invention, the transaction record is a Certificate of Mailing providing proof that a message was submitted to an e-Mail server outside the control of the mailer.

According to another aspect of the present invention, the transaction record is a Certificate of Delivery providing proof that a message was delivered to an e-Mail system where the addressee is capable of receiving e-Mail.

According to another aspect of the present invention, the authenticated transaction record is embedded in the e-Mail message.

According to another aspect of the present invention, an authenticated transaction record is sent in conjunction with the corresponding e-Mail message to at least one addressee.

According to another aspect of the present invention, the e-Mail servers electronically sign e-Mail messages using a Digital Certificate issued to the server as a digital identity.

According to another aspect of the present invention, the regulated e-Mail messaging application is invoked as a mail filter from an SMTP mail server.

According to another aspect of the present invention, the unique identifier of the electronic postmark is embedded in a plurality of e-Mail messages.

According to another aspect of the present invention, at least one e-Mail message containing the embedded unique identifier of the electronic postmark is sent to a plurality of addressees.

According to another aspect of the present invention, the mailing is preceded by delivery to an e-Mail system of at least one waybill listing the authenticated messages to be delivered to addressees having addresses at the e-Mail system.

According to an aspect of the present invention, a device provides Postal Authority regulated e-Mail messaging over a public network to a plurality of mailers and addressees using authenticated transaction records. The device transmits at least one e-Mail message through at least one e-Mail account established for a mailer whose identity has been verified by one of a Postal Authority and an agent of the Postal Authority. The device obtains electronic postmarks to authenticate transaction records. The device also send to the mailer a Certificate of Mailing providing proof that a message was submitted to an e-Mail server outside the control of the mailer. The device sends to the mailer a Certificate of Delivery providing proof that a message was delivered to an e-Mail system where the addressee is capable of receiving e-Mail. The device embeds a unique identifier of an electronic postmark in the e-Mail message as a graphical image in which the electronic postmark is embedded using stegonography, and sends to at least one addressee the e-Mail message incorporating the unique identifier. Authenticated e-Mail messages and corresponding transaction records are created and protected from undetectable modification. Each party may later present authenticated e-Mail messages and transaction records for validation, the validation including submitting at least one of the message and the transaction record to a verifier and returning details of the verification to the presenting party.

According to another aspect of the present invention, the addressees' terminal e-Mail servers may selectively accept e-Mail messages subject to the presence of a unique identifier of an electronic postmark.

According to another aspect of the present invention, the authenticated transaction record is embedded in the e-Mail message.

According to another aspect of the present invention, the e-Mail servers electronically sign e-Mail messages using a Digital Certificate issued to the server as a digital identity.

According to another aspect of the present invention, the regulated e-Mail messaging application is invoked as a mail filter from an SMTP mail server.

According to another aspect of the present invention, the mailing is preceded by delivery to an e-Mail system of at least one waybill listing the authenticated messages to be delivered to addressees having addresses at the e-Mail system.

An embodiment of the present invention is a Standard e-Mail Service that uses postmarked digital receipts and/or Web Receipts services. A flow chart illustrating an exemplary Standard e-Mail Service exchange is shown in FIG. 1. At 101, mailer A (e.g. commercial advertiser, marketing agency) initiates a mass mailing to multiple recipients included on a mailing list. At 201, mailer A initiates a transaction by sending an e-Mail message, including a list of addressees and the "mail piece" to be sent to the addressees, to an e-Mail (e.g., SMTP) server configured for Standard e-Mail Service. Mailer A uses a First Class e-Mail Service account to initiate the transaction.

The Standard e-Mail Service is configured such that it may obtain from a Postal Service an appropriate National Postal Service Electronic Postmarks (EPM) providing official date and time, as well as attestation by the Postal Service as to the validity of a postmarked transaction. The Standard e-Mail Service server may electronically sign e-Mail messages using a Digital Certificate issued to the server or other means of digital identity. At 301, the Standard e-Mail Service postmarks, using the Postal EPM Service, the body of e-Mail messages and attachments from mailer A. At 401, the Standard e-Mail Service returns a postmarked receipt as an electronic Certificate of Mailing in the form of an e-Mail message. The Certificate of Mailing includes "From-To" information, Subject, Message ID, and EPM S/N, as well as notice of status as an official postal transaction. The Certificate of Mailing may further include the EPM embedded in the message or as an attachment. The EPM may be embedded in its native text form or in a graphical image incorporating its native text form using stegonography. Certificates of Mailing may be validated using the Validation Service of the present invention. An exemplary form of a Certificate of Mailing that may be employed in initiating Standard Class e-Mail is shown in Section 1 of the attached Appendix.

Alternatively, at 1001, mailer B initiates a transaction at a Web site configured for Standard e-Mail Service. At 2001, mailer B uploads the list and mail piece to the web site. Mailer B uses a Postal account to initiate the transaction. A mailer's identity may be authenticated as a prerequisite to establishing an account. At 3001, the Standard e-Mail Service communicates with the Postal EPM Service to have the details of the Web transaction (i.e., the Web Receipt) postmarked. At 4001, the Certificate of Mailing is automatically returned to mailer B from the Web Receipt Service. A web browser displays the Certificate of Mailing as a functional element of initiating a mail transaction.

A Web Receipt may be provided in accordance with aspects of the teachings of U.S. Provisional Application 60/470,867. In an embodiment, the Certificate of Mailing may be provided in the form of a graphical image. The Certificate of Mailing may be embedded along with the EPM S/N in the Web Receipt returned to the mailer. Using a Postal Validation Service, the Certificate of Mailing can be accessed by mailer B at the Web Receipt Service. The Web Receipt as a Certificate of Mailing may provide attributes of the postmarked e-Mail message and attachments, the corresponding EPM, and official notice of postal transaction status. Certificates of Mailing may be validated using a Validation Service of the Web Receipt Service or First Class e-Mail Service.

The Standard e-Mail Service may process a transaction initiated by a mailer by initiating standard e-Mail (e.g., SMTP) message transactions to each addressee on the list received from the mailer. Each "Standard Class e-Mail" message is constructed at 501 and sent at 601 to each addressee on the list. Each Standard Class e-Mail message may have embedded therein the EPM S/N of the electronic transaction initiated by the mailer for the mass mailing. Each Standard Class e-Mail provides official notice of status as a postal mail transaction. Standard Class e-Mail messages may further include the EPM of the transaction initiated by the mailer. However, incorporating only the EPM S/N instead of the entire EPM reduces the bandwidth required to process the outgoing mailings to the mailing list. An EPM may approximate a 2,000-byte file, while the EPM S/N may be as few as 20 to 30 bytes. Such size differences combined with large numbers of mailings may have a significant impact on bandwidth requirements, processing cost and service pricing.

Standard Class e-Mails are received at 701. At 801, the recipients of Standard Class e-Mail may validate that received messages are valid postal transactions by authenticating the EPM or EPM S/N provided in or otherwise with the message. EPM authentication may be accomplished by submitting the message and the EPM S/N embedded in the message to a Validation Service. Submission may be in the form of forwarding the postal message received to the Validation Service. The Validation Service may then compare attributes of the message to those captured in the EPM for the corresponding transaction. An indication of transaction validity and mailer identity may be returned. As an example, the Validation Service may derive a mailer's identity from the mailer's Postal Trust Account information.

Figure 2:
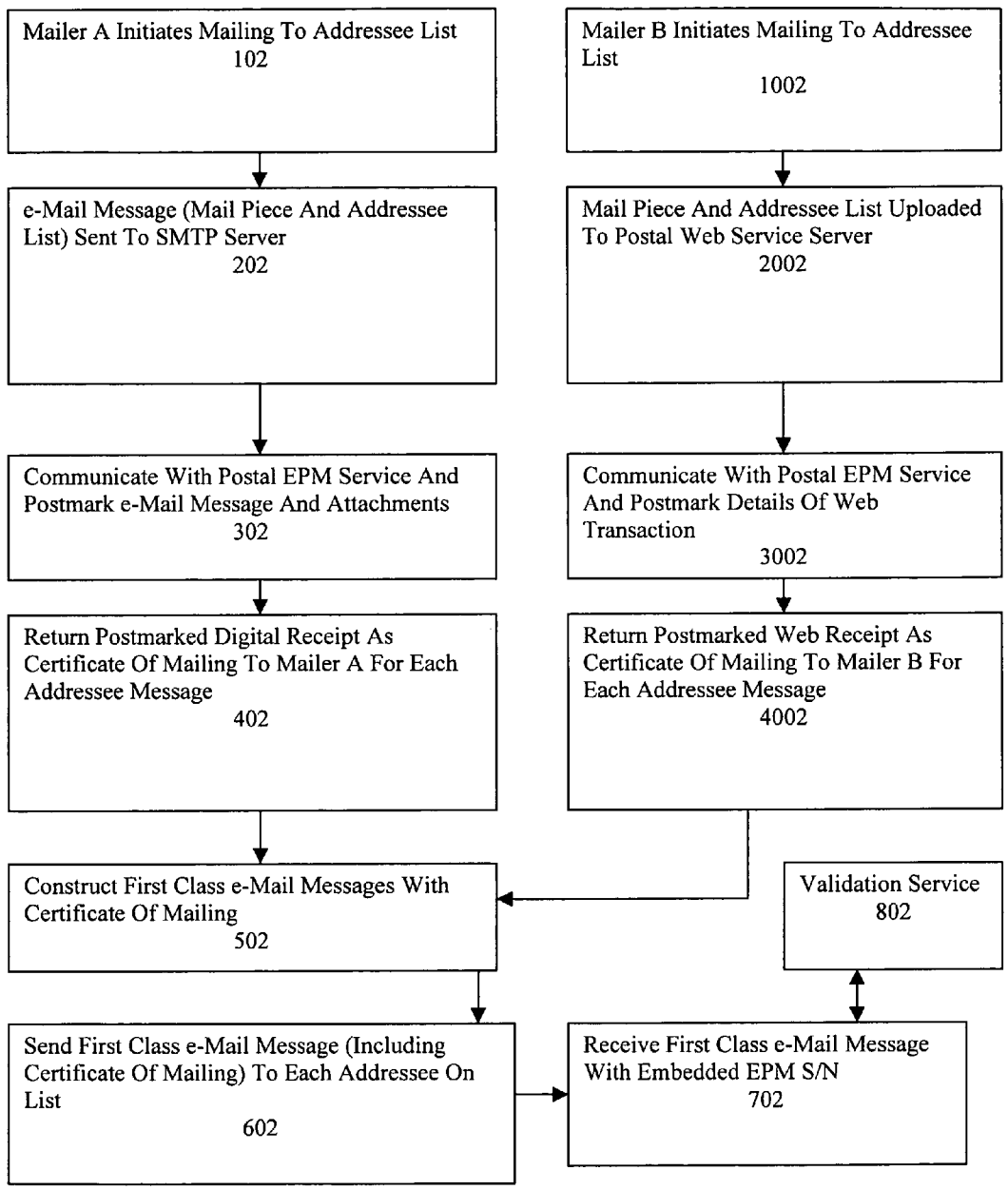
FIG. 2 is a flow chart showing a typical First Class e-Mail Service, according to the invention.

Another embodiment of the present invention is a "First Class e-Mail Service" that uses postmarked digital receipts and Web Receipt services. A flow chart illustrating an exemplary First Class e-Mail Service exchange in accordance with an embodiment of this invention is shown in FIG. 2. At 102, mailer A (e.g., utility company, government agency) initiates a mailing to one or more recipients included on a mailing list. The mailer may initiate the transaction at 202 by sending an e-Mail message, including the list of addressees and the mail piece, to an e-Mail (e.g., SMTP) server configured for First Class e-Mail Service. Alternatively, at 1002, the mailer B initiates the transaction at a Web site configured for First Class e-Mail Service. At 2002, the mailer B uploads the mail piece to the Web site. Furthermore, if the list is not already resident at the Service, the list is uploaded to the Web site as well.

In another embodiment, the First Class e-Mail Service is configured such that it obtains from a Postal Service an appropriate Postal Service Electronic Postmark (EPM) providing official date and time, as well as attestation by the Postal Service as to the validity of a postmarked transaction. The First Class e-Mail Service server may electronically sign e-Mail messages using a Digital Certificate issued to the server or other means of digital identity. At 302 or 3002, the First Class e-Mail Service postmarks the body of e-Mail messages and attachments it receives as e-Mail (302) or as details of a Web transaction (3002) from the mailer. At 402 or 4002, the First Class e-Mail Service returns a postmarked receipt as an electronic Certificate of Mailing for each e-Mail message sent to an addressee. A Certificate of Mailing may be in the form of an e-Mail message (402) or a Web Receipt (4002). The Certificate of Mailing may include "From-To" information, Subject, Message ID, and EPM S/N, as well as notice of status as an official postal transaction. The Certificate of Mailing may further include the EPM for the specific e-Mail transaction initiated by the mailer embedded in the certificate message or as an attachment. The EPM may be embedded in its native text form or in a graphical image incorporating its native text form using stegonography. The First Class e-Mail messages are constructed with Certificates of Mailing at 502. Each First Class e-Mail message may include the "mail piece" and the Certificate of Mailing, as well as the EPM and/or EPM S/N. At 602, First Class e-Mail messages are sent to addressees using standard e-Mail protocols. At 702, recipients receive the First Class e-Mail message with an embedded EPM S/N. At 802, recipients using the Validation Service of the present invention and/or U.S. Patent Application 60/470,867 may validate Certificates of Mailing along with an EPM. Mailer identity authentication may be a prerequisite for an account, providing a level of assurance as to sender identity. An exemplary form of a Certificate of Mailing that may be used in First Class e-Mail Service is shown in Section 2 of the attached Appendix.

In an embodiment, the Certificate of Mailing for "First Class e-Mail" may be constructed at 3002 in the form of a graphical image. In this embodiment, the Certificate of Mailing is automatically returned to the mailer from the Web Receipt Service at 4002. A web browser displays the Certificate of Mailing as a functional element of initiating a mail transaction. A Web Receipt may be provided in accordance with the teachings of U.S. Provisional Application 60/470, 867. The Certificate of Mailing may be embedded along with the EPM S/N in the Web Receipt returned to the mailer. Using a Postal Validation Service, the Certificate of Mailing can be accessed by the mailer at the Web Receipt Service. As a Certificate of Mailing, the Web Receipt may provide attributes of the postmarked e-Mail message and attachments, the corresponding EPM, and official notice of postal transaction status. Certificates of Mailing may be validated at 802 using a Validation Service of the Web Receipt Service or First Class e-Mail Service.

Figure 3:
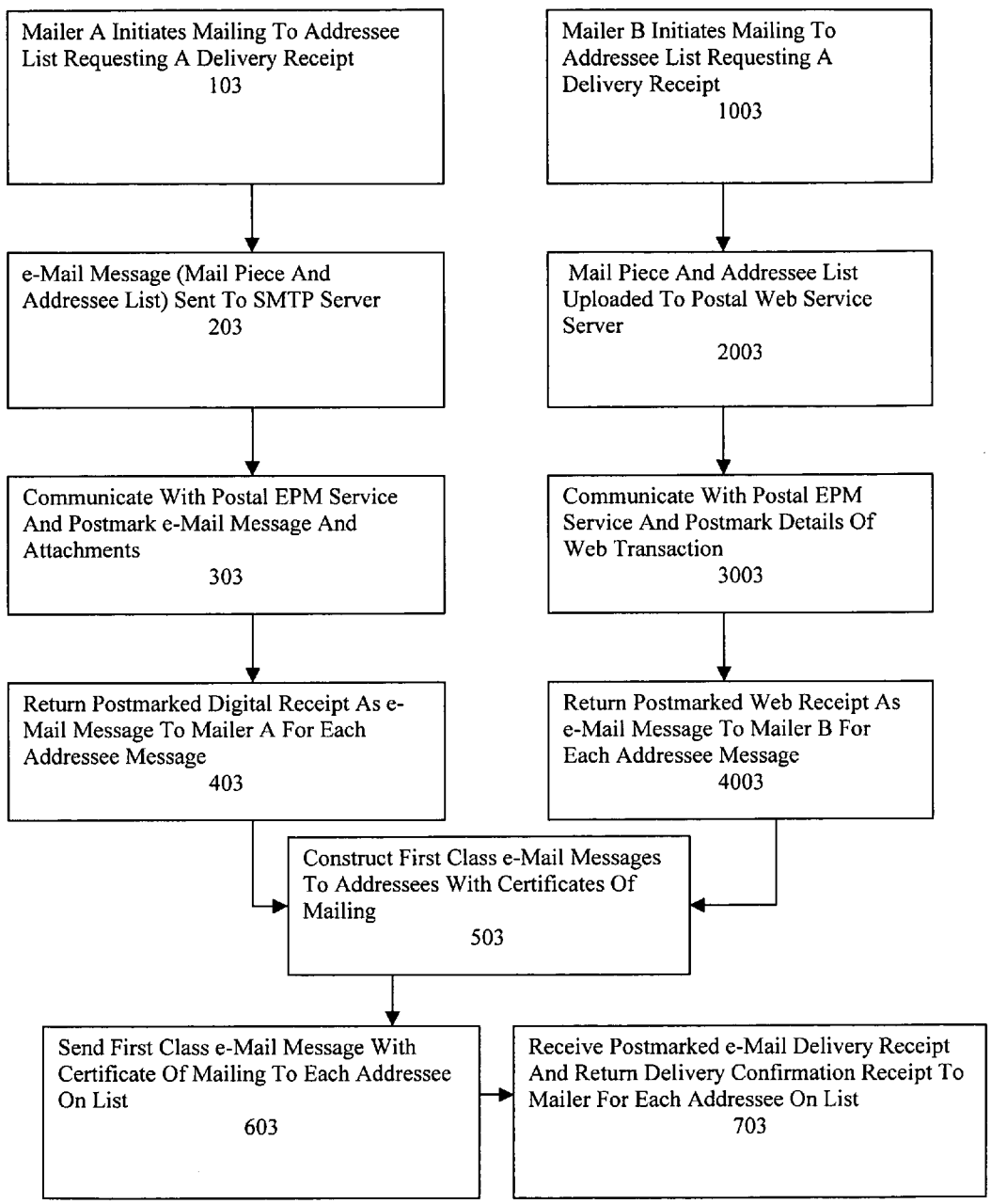
FIG. 3 is a flow chart showing typical First Class e-Mail Service with Delivery Confirmation, according to the invention.

In the embodiment shown in FIG. 3, Delivery Confirmation Service may be facilitated for First Class e-Mail Service transactions at 503. FIG. 3 shows a flow chart illustrating exemplary "First Class e-Mail Service with Delivery Confirmation". At 703, Delivery Confirmation Service returns a postmarked receipt as an electronic Delivery Confirmation Receipt for each e-Mail message sent by a mailer A or B. The Delivery Confirmation Receipt may be in the form of an e-Mail message. The Delivery Confirmation Receipt may include "From-To" information, Subject, Message SMTP ID, and EPM S/N, as well as notice of status as an official postal transaction. The Delivery Confirmation Receipt may further include the EPM embedded in its native text form or in a graphical image incorporating its native text form using stegonography. First Class e-Mail Service servers may automatically initiate Delivery Confirmation Receipts, relying on messaging protocols to recognize completion of message delivery to addressee servers. Delivery Confirmation Receipts confirm for the mailer that the message and attachments were delivered to an address. This confirmation represents an attestation by the First Class e-Mail Service and Postal Authority that a message was delivered to a server (e.g., message handler) for a designated address.

Delivery Receipt requests are also supported by e-Mail messaging standards (e.g., RFC 1891, RFC 1892), and a range of e-Mail clients and servers support such requests. For example, Microsoft Outlook provides a Delivery Receipt request option. Standard html protocols automatically activate the notification process upon delivery of the e-Mail message to the addressee's (RFC compliant) e-Mail server, returning at 703 a Delivery Receipt to the First Class e-Mail Service server. No addressee action is required. A Delivery Confirmation Receipt may be created at a First Class e-Mail Service server by communicating with the Postal EPM Service at 703 to obtain a postmarked Delivery Receipt. In another embodiment, Delivery Confirmation receipts incorporate the EPM corresponding to the Certificate of Mailing. The postmarked Delivery Confirmation Receipt is returned to the Mailer that initiated the transaction at 703. Mailer identity authentication may be an account prerequisite, providing a level of assurance as to sender identity.

Figure 4:
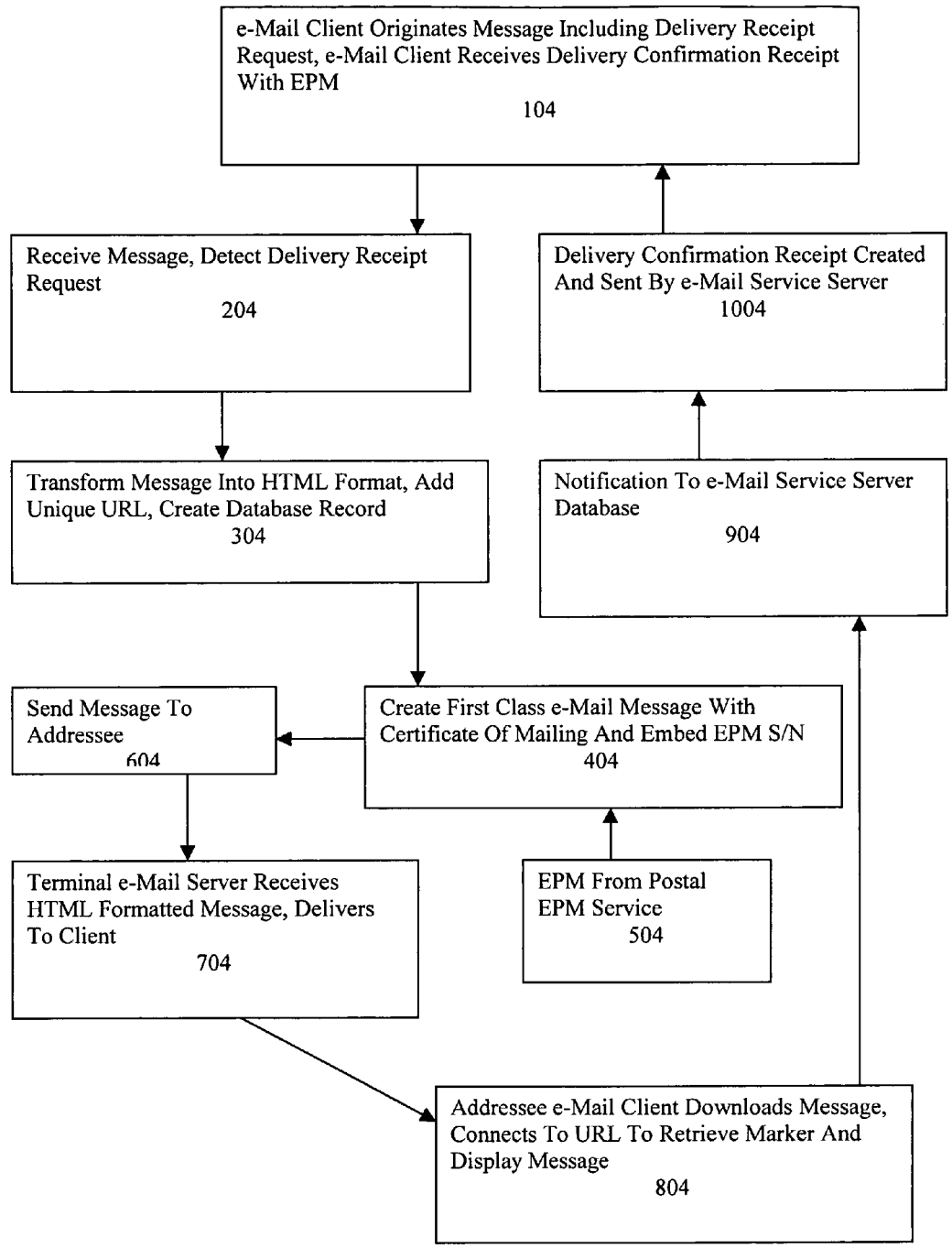
FIG. 4 is a flow chart showing typical First Class e-Mail Service with Delivery Confirmation using an html link, according to the invention.

Referring now to FIG. 4, in another embodiment of the present invention, First Class e-Mail Service with Delivery Confirmation is facilitated using an html link and EPM S/N embedded in the e-Mail message. At 104, a mailer originates an e-Mail message and makes a standard Delivery Receipt request. At 204, the First Class e-Mail Service server receives the message and detects the Delivery Receipt request. At 304, the server may then transform the body of e-Mail messages into html format and add a unique Universal Resource Locator—URL (i.e., a marker) for an element such as a small or "zero byte" image or the EPM S/N. An example of a unique marker follows: "smtp.usmail/receipts.com/postoffice/delivery?receiptid=XXXXX", where XXXXX is the EPM S/N. This marker must be unique for each message addressee.

At 304, the First Class e-Mail Service creates a record in a database indicating that the server expects a reply. At 404, the First Class e-Mail Service creates a First Class e-Mail message including the message with URL, EPM S/N received at 504 with an EPM from a Postal EPM Service, and a Certificate of Mailing. At 604, the server sends the first Class e-Mail message to the addressee's e-Mail server, and the Certificate of Mailing to the mailer. At 704, the addressee's e-Mail server receives "marked" e-Mail messages from which the addressee downloads e-Mail messages at 804. When e-Mail clients (supporting html) display the message, which is in html format, the e-Mail client connects to the embedded URL address at 804 in order to retrieve the marker and display the message properly. At 904, the e-Mail connection to the unique URL at the First Class e-Mail Service provides notification to server database upon opening of the message by the addressee. At 1004, a Delivery Confirmation Receipt is created by the server in the form of an e-Mail message. The Delivery Confirmation Receipt includes "From-To" information, Subject, Message ID, and EPM S/N, as well as notice of status as an official postal transaction. No user action other than opening the e-Mail message is required. A Delivery Confirmation Receipt may be created for Web-based e-Mail at a Web Receipt Service or a First Class e-Mail Service. The Web Receipt Service or First Class e-Mail Service may provide a Web Receipt in accordance with aspects of the present invention.

In another embodiment of the present invention, First Class e-Mail Service with Delivery Confirmation is facilitated for the mailer using a "Read Receipt" that confirms that the message and attachments were delivered. The mailer may initiate Delivery Confirmation using standard Read Receipt request functions provided in most e-Mail client software, such as Microsoft Outlook and Outlook Express. If the addressee returns the requested Read Receipt, the Delivery Confirmation Service may embed the EPM S/N in the Read Receipt e-Mail message. Further, the Delivery Confirmation Service may obtain an EPM for the Read Receipt from the Postal EPM Service, or otherwise construct a Delivery Confirmation Receipt in accordance with the present invention. This represents an attestation by the First Class e-Mail Service and Postal Authority that a message was delivered. Standard e-Mail protocols and options may also be used to automatically activate the Read Receipt process upon opening of the e-Mail message. In this event, no user action other than opening the e-Mail message may be required. An exemplary form of a Delivery Confirmation Receipt as an e-Mail message including a postmarked Read Receipt is shown in Section 3 of the attached Appendix.

In another embodiment of the present invention, Certified Mail Service may be facilitated for First Class e-Mail Service transactions. A postmarked receipt is returned as an electronic Certification of Delivery Receipt for each e-Mail message sent to an addressee. The Certification of Delivery Receipt may be in the form of an e-Mail message that includes "From-To" information, Subject, Message ID, and EPM S/N, as well as notice of status as an official postal transaction. The Certification of Delivery Receipt may further include an EPM which is embedded in its native text form or a graphical image incorporating its native text form using stegonography. The Certification of Delivery Receipt may be electronically signed by an enterprise e-Mail server on behalf of a specific addressee using a Digital Certificate issued to the enterprise server or other means of digital identity. A Certification of Delivery Receipt confirms for the mailer initiating an e-Mail transaction that the message and attachments were delivered to the terminal e-Mail server from which the intended addressee retrieves e-Mail messages. This represents an attestation by the enterprise server, the First Class e-Mail Service, and the Postal Authority that a message was delivered to the enterprise to which the Digital Certificate or other means of digital identity used to sign the receipt was issued. A flow chart illustrating exemplary "First Class e-Mail Service with Certification of Delivery" is shown in FIG. 5.

Delivery Receipt requests are supported by e-Mail messaging standards (e.g., RFC 1891, RFC 1892), and a range of e-Mail clients and servers support such requests. For example, Microsoft Outlook provides a Delivery Receipt request option. Standard html protocols automatically activate the notification process upon delivery of the e-Mail message to the addressee's e-Mail server, returning a Delivery Receipt to the First Class e-Mail Service server. No addressee action is required. The present invention augments the functionality of standard Delivery Request protocols to provide electronic signing of Delivery Receipts by receiving terminal e-Mail servers on behalf of addressees. The terminal server must have a digital certificate or other digital identifier issued by a trusted source (e.g., Certificate Authority). Subject to terminal server configuration in accordance with the present invention, a Delivery Certification Receipt may be created by a First Class e-Mail Service server by communicating with the Postal EPM Service to postmark a Delivery Receipt electronically signed by a terminal server receiving a request for signed Delivery Receipts. The postmarked Delivery Certification Receipt is returned to the Mailer that initiated the transaction. In the event a terminal e-Mail server is not configured to electronically sign Delivery Receipts in accordance with the present invention, a standard Delivery Confirmation Receipt is returned by the First Class e-Mail Service to the mailer along with notification that the addressee's terminal server lacked signing capability or authorization.

Figure 5:
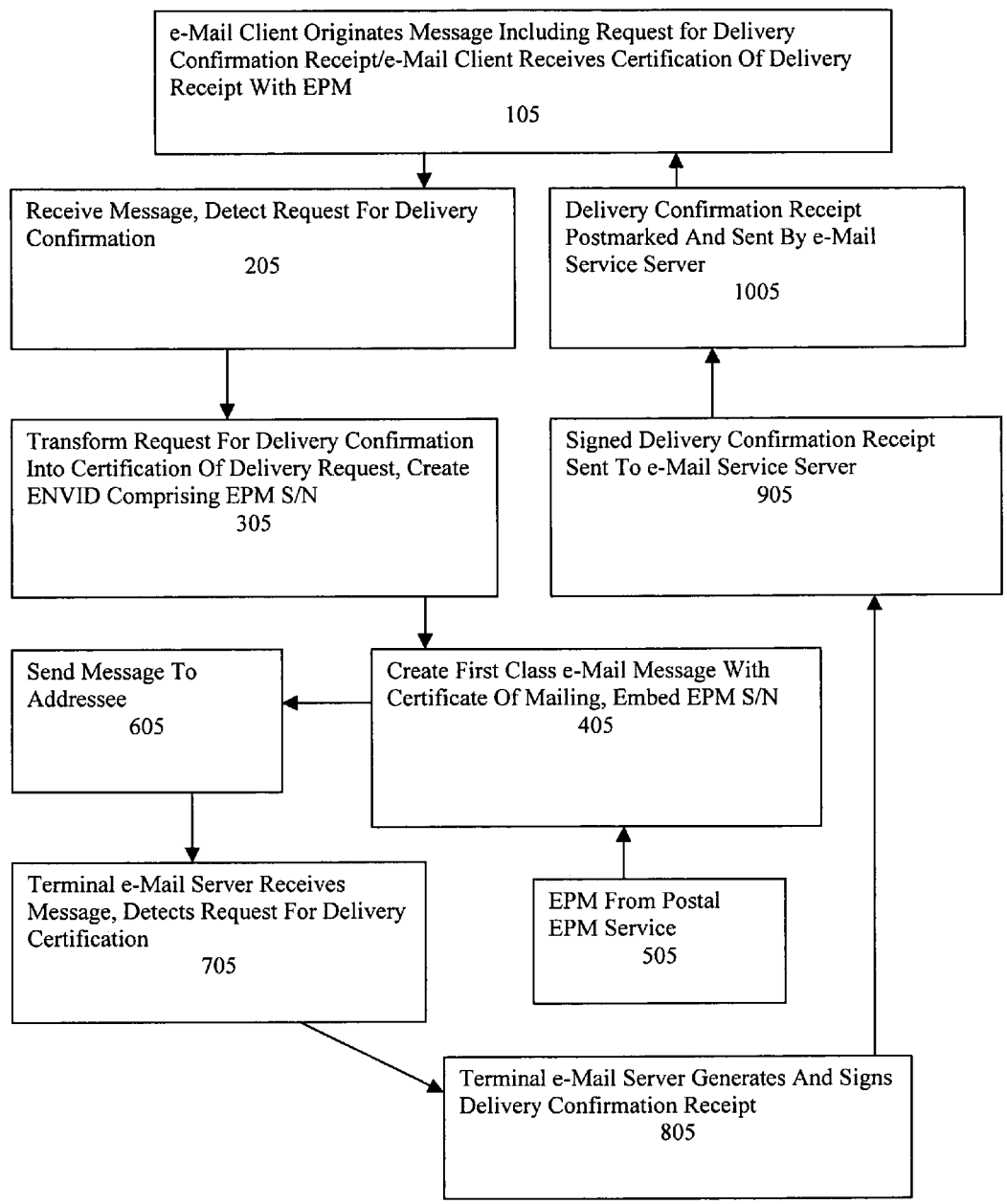
FIG. 5 is a flow chart showing typical First Class e-Mail Service with Certification of Delivery, according to the invention.

Referring now to FIG. 5, at 105 a mailer originates an e-Mail message and makes a Delivery Certification request. The Delivery Certification request may be made using a standard Delivery Confirmation option by selecting a Certified Delivery e-Mail account from a range of accounts that are setup and accessed through standard e-Mail clients. At 205, the First Class e-Mail Service server receives the message and detects the Delivery Certification request. At 305, the First Class e-Mail Service server, configured to provide Certified Delivery service, transforms the standard Delivery Confirmation request into a Certified Delivery request by embedding the EPM S/N as an SMTP "envelop identifier" (ENVID=EPM S/N XXXXX) that is transmitted along with the message. At 405, the First Class e-Mail Service server creates a First Class e-Mail message with Certificate of Mailing and an embedded EPM that is received at 505 from the Postal EPM Service. At 605, the First Class e-Mail Service sends the message to an addressee. Using standard e-Mail (e.g., SMTP) protocols, at 705 the terminal server recognizes receipt of the First Class e-Mail message with the embedded EPM and request for a Certification of Delivery Receipt. The terminal server uses standard e-Mail protocols to generate a Delivery Receipt documenting message delivery to the server, uses functions of the present invention to digitally sign the receipt at 805, and returns it to the First Class e-Mail Service server at 905.

As noted, the First Class e-Mail Service communicates with the Postal EPM Service 505 to obtain an EPM for the Certification of Delivery Receipt. The Certification of Delivery Receipt may be in the form of an e-Mail message that includes "From-To" information, Subject, Message ID, and EPM S/N, as well as notice of status as an official Postal transaction. The Certification of Delivery Receipt may further include the e-Mail Delivery Receipt returned electronically signed by a terminal e-Mail server on behalf of a specific addressee. No user action such as opening the e-Mail message is required. At 1005, a Certification of Delivery Receipt is created at and provided by the First Class e-Mail Service. As described herein, the Certification of Delivery Receipt may be validated using a Validation Service of the Web Receipt Service or First class e-Mail Service.

In another embodiment of the present invention, Certified Restricted Delivery Mail Service may be facilitated for First Class e-Mail Service transactions. The Certified Restricted Delivery Mail Service returns a postmarked receipt as an electronic Certification of Delivery Receipt digitally signed by the addressee for each e-Mail message sent to an addressee. The Certification of Delivery Receipt may be in the form of an e-Mail message that includes "From-To" information, Subject, Message ID, and EPM S/N, as well as notice of status as an official postal transaction, and which receipt is electronically signed by a specific addressee. The message may also have been encrypted for the Digital certificate of the addressee using standard S/MIME features widely available in e-Mail clients. Certification of Delivery Receipt with an addressee's digital signature confirms for the mailer initiating an e-Mail transaction that the message and attachments were delivered to the intended addressee who retrieved the e-Mail message. This represents an attestation by the addressee and the Service that a message was delivered to the addressee to which the Digital Certificate used to sign the receipt was issued. A flow chart illustrating exemplary "First Class e-Mail Service with Certification of Delivery to an Addressee" is shown in FIG. 6.

Figure 6:
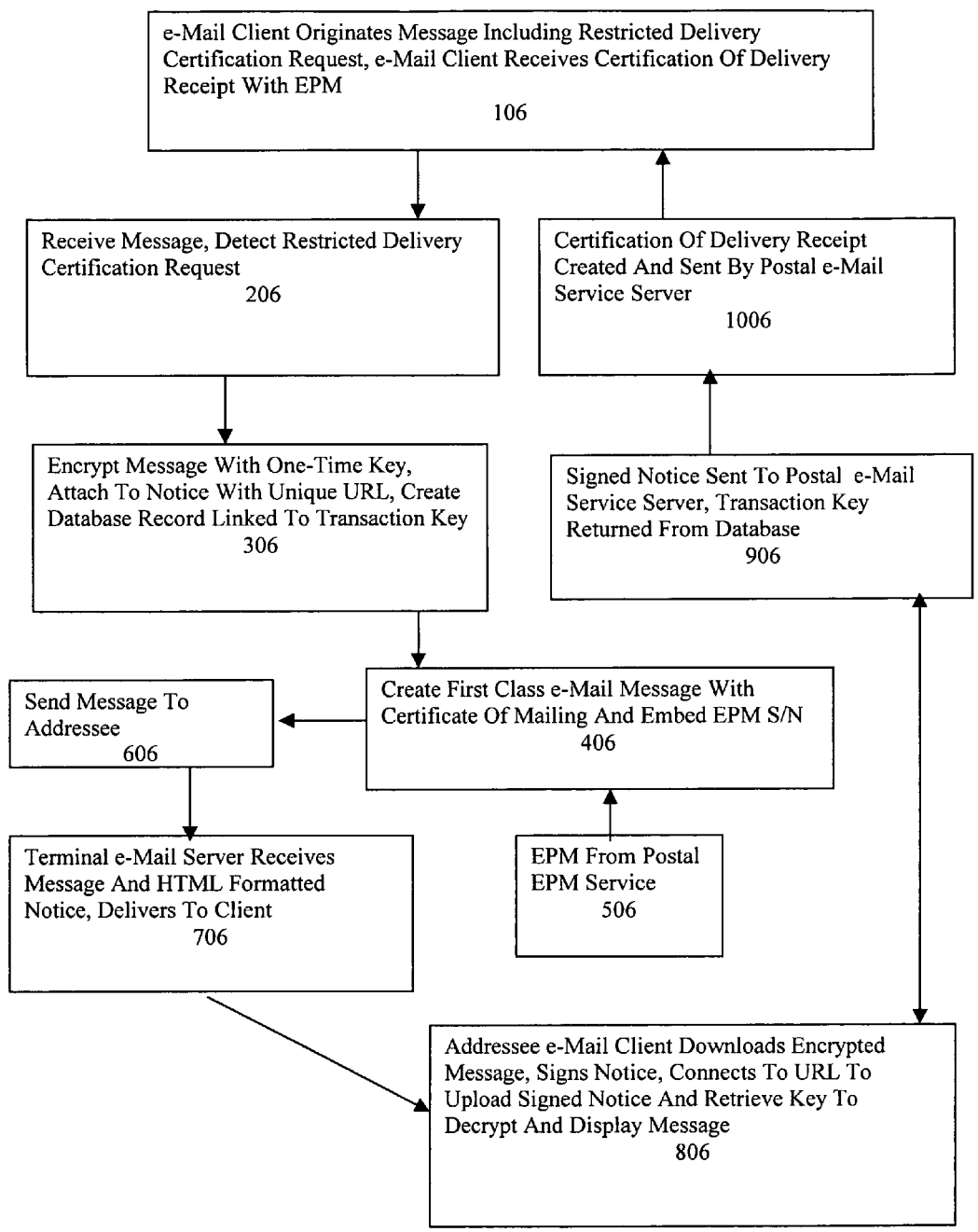
FIG. 6 is a flow chart showing typical First Class e-Mail Service with Certified Restricted Delivery, according to the invention.

Referring now to FIG. 6, at 106 a Mailer originates an e-Mail message and makes a Restricted Delivery Certification request. The Restricted Certification request may be made using the standard Delivery Confirmation option by selecting Certified Restricted Delivery e-Mail account from a range of accounts that may be setup and accessed through standard e-Mail clients. At 206, the First Class e-Mail Service server receives the message and detects the Delivery Certification request. At 306, the Certified Restricted Delivery Mail Service encrypts the e-Mail message it receives from the mailer using a "one-time" encryption key ("Transaction Key") linked to the EPM S/N of the mailer's message, temporarily storing the key in a database on a server. At 306, the encrypted message is attached to a delivery notice in html format containing an embedded link to a unique Universal Resource Locator (URL, i.e., a marker) of a server at the Mail Service. The URL may be an element such as a small or "zero byte" image or the EPM S/N. An example of a unique marker is: "smtp.usmail/receipts.com/postoffice/delivery?receiptid=XXXXX", where XXXXX is the EPM S/N. This marker must be unique for each message addressee. The First Class e-Mail Service may create a record in a database indicating that the server expects a reply. At 406, the First Class e-Mail Service creates a First Class e-Mail message comprising the message with URL, EPM S/N received at 506 with an EPM from a Postal EPM Service, and Certificate of Mailing. At 606, the encrypted message with notice is sent to the terminal server.

Using standard SMTP protocols, the encrypted Restricted Delivery First Class e-Mail message with the embedded EPM and EPM S/N is delivered to the addressee at 706. The delivery notice informs the addressee of delivery of a postmarked e-Mail message requiring the addressee's digital signature. The Mail Service server is configured with elements of the present invention that effect generation of a digital receipt including the signed notice that may be used to document message delivery to the addressee. The addressee must digitally sign the notice at 806 and, using the URL link, return it to the Mail Service server to activate delivery of the Transaction Key from the Mail Service server to the addressee. The Transaction Key can then be used to "open" the message. At 906, the e-Mail connection to the unique URL at the First Class e-Mail Service provides notification to the server database upon opening of the message by the addressee. The Mail Service server communicates with the Postal EPM Service to obtain an EPM for the certification receipt. At 1006, the First Class e-Mail Service returns a postmarked Certification of Delivery Receipt digitally signed by the addressee to the mailer certifying delivery to the addressee.

The Certification of Delivery Receipt may be in the form of an e-Mail message. The Certification of Delivery Receipt includes "From-To" information, Subject, Message ID, and EPM S/N, as well as notice of status as an official postal transaction. The Certification of Delivery Receipt further includes the digital signature of a specific addressee. A Certification of Delivery Receipt may be created at and provided by a First Class e-Mail Service in accordance with aspects of the present invention. Certification of Delivery Receipt may be validated using a Validation Service of the Web Receipt Service or First class e-Mail Service. Validation of a message recipient's Digital Certificate may be obtained from the issuing Certificate Authority.

In another embodiment, terminal dues may be paid to ISPs and participating enterprises that deliver Postal e-Mail messages to addressees. To receive payment from the sending ISPs and participating enterprises providing First Class e-Mail Service, each delivering ISP providing First Class e-Mail Service and/or each participating enterprise terminal server maintains a record of the Postal e-Mail transactions processed based on EPM S/N numbers and originating information. ISPs and participating enterprises may periodically present invoices to each other using a Postal e-Mail Service or a using Web Receipts with EPM in a web transaction. Payments may be made by incrementing and decrementing Postal Trust Accounts, as well as direct payments.

Another embodiment of the present invention enables standard conditions for passing e-Mail through filtering processes at ISPs and enterprise e-Mail servers. ISPs and participating enterprises, authorized and setup to originate Postal e-Mail, and whose trust accounts are in good standing may be included in a "white-list" of trusted postal e-Mail servers. The white-list of trusted postal e-Mail servers may be maintained by the National Postal Service or its authorized agent. The "white-list" is published on the Internet and accessible to ISPs and enterprise e-Mail servers to authenticate sending e-Mail servers as authorized Postal e-Mail Service Providers or participants in good standing. The Postal e-Mail servers may electronically sign e-Mail messages using a Digital Certificate issued to the server as a means of digital identity. Terminal server e-Mail filters may be set to pass Postal e-Mail messages originated through ISPs and enterprise participants on the "white-list" and containing embedded, valid EPM Serial Numbers or a valid EPM.

In another embodiment, sending Postal e-Mail servers may generate and digitally sign for each mailing a "waybill" for each ISP. The waybill lists all EPM authenticated messages and corresponding EPM S/Ns in a mailing to be delivered to each ISP. The waybill is sent to the corresponding ISP prior to the messages in the mailing. The receiving ISP may use the waybill content as selective acceptance criteria for message delivery to addressees, eliminating the need for content filtering and increasing delivery assurance for legitimate messages.

Another embodiment of the present invention enables application of First Class e-Mail Service for "opt-out" provisions in commercial e-Mail messages. Opt-out provisions are typical of national laws such as the CAN-SPAM Act. An opt-out option may be enabled by embedding a URL in an e-Mail message. Exercise of an opt-out option may link to a web server of a First Class e-Mail Service and initiate a First Class e-Mail message to an advertising mailer or third-party agent such as the Direct-Mail Marketing Association (DMA). Failure of an advertiser to remove an addressee from a mailing list following submission of an opt-out request using a First Class e-Mail message may provide the addressee with recourse through the National Postal Service. Typically, pandering laws or regulations apply, and may be enforced against the mailer by the Postal Service. Further, any unlawful act involving misuse of First Class e-Mail Services, the EPM, or EPM S/N may subject the mailer to investigation and prosecution under governing wire fraud and National Postal laws.

Another embodiment of the present invention enables application of First Class e-Mail Service with Restricted Delivery Certification for Registered Mail services. A mailer accesses First Class e-Mail Service with Restricted Delivery Certification at a Postal Web server by registering the intrinsic value of the transaction and requesting insurance against loss in an amount not exceeding loss limits established by a National Postal Service. Using Web Receipt Services of the present invention, the Postal e-Mail transaction is initiated and a postmarked Web Receipt documenting the details of the transaction is returned to the mailer.

In another embodiment, standard e-Mail server software may be augmented with computer programs operating in accordance with aspects of the present invention to enable Postal e-Mail Service server functionality. Computer programs operating in accordance with aspects of the present invention may generate digital receipts that may be in the form of an e-Mail message. The digital receipts include "From-To" information, Subject, Message ID, and EPM S/N, as well as notice of status as an official postal transaction. The digital receipts may further include the digital signature of an e-Mail server on behalf of a specific addressee.

By way of example a partial computer program is shown in Section 4 of the attached Appendix.

Such computer programs may enable communication with Postal EPM Services to obtain electronic postmarks, and may transmit e-Mail messages to designated recipients and receipts to mailers.

In an embodiment, computer programs operating on e-Mail servers in accordance with aspects of the present invention may also accomplish validation of EPMs and postmarked messages, as well as verification that a sending e-Mail server is on the "white-list" of authorized Postal e-Mail Service servers. Using such computer programs, EPM S/N markers may be encrypted and embedded in messages along with corresponding markers in an unencrypted state. Encrypted EPM markers may be decrypted and compared with corresponding markers in their unencrypted state, where the comparison facilitates selective acceptance or rejection of marked messages by terminal servers.

In another embodiment, a Postal e-Mail Service application may be invoked as a mail filter from an SMTP mail server. A primary function of the application is to act on the behalf of the mail server as a Digital Signature Authority and as an issuer of an Electronic E-mail Receipts (EER) containing U.S. Postal Service or other postal authority Electronic Postmarks (EPM). A primary function of the application is to take an e-Mail message being routed by an SMTP e-Mail Server and add an EER. The application may have the ability to sign the e-Mail message after adding an EER. The application may create and send a Certificate of Mailing and a Certificate of Delivery. A secondary function of the application may be to create and verify e-Mail messages and generate an XML document containing the results of the verification. This application need not take part in the transmission of the messages.

In another embodiment, application required arguments include:
- -c configfile Indicates the path to the configuration file the application is to use when running.
- -out DEST Specifies the file to write the new e-Mail message to.
  The location this points to must be writable or the application will not output anything.

In another embodiment, application required operations include:
- -postmark Generate a postmarked message. The FILE specifies the contents of the e-Mail the application is to postmark. Requires the -receipt option.
- -mailing Generate a mailing receipt message. The FILE specifies the path to the receipt file created by the postmark operation.
- -delivery Generate a delivery confirmation message. The FILE specifies the path to the receipt file created by the postmark. Requires the -to option.
- -verify Causes the application to verify the contents of the e-Mail message. Requires the -to option.

In another embodiment, other application options include:
- -h Print the help information out.
- -sign Tells the application to apply a digital signature using the X.509 certificate and private key identifying the mail server. Installed with the application and specified in the configuration file. This option is valid with all operators.
- -receipt file Indicates the path to put the receipt data into. Required when -postmark is used. Not valid any other time.
- -to Tells the application the recipient the message was delivered to. Required when using -delivery or -verify.

In another embodiment, a result of issuing an EER and/or signing an e-Mail message with the application causes a copy of the message to be created that contains the same elements of the original e-Mail message plus a stegonographic GIF image containing the EER. If the message is signed, the message is S/MIME encoded as well. To aid in extracting the graphic EER MIME part for verification purposes, the MIME part containing the graphic is identified with the content type of "application/x-emailreceipt-epm". Additionally, the e-Mail message itself has a header line added to show that it was processed and certified by the application and to provide version information. An example of the header line is "USPS-Certifier: EmailIdentity Version 1.0".

The use of digital signatures on e-Mail messages from the e-Mail server allows recipients of the e-Mail from the e-Mail server to know that the e-Mail originated from the e-Mail server or service. In other words, it specifies the WHO. The use of digital signatures using standard S/MIME allows ordinary e-Mail clients to authenticate that the e-Mail message came from a particular e-Mail server without manual user intervention. When used by a non-relay mail server with authenticated clients, the digital signature provides limited protection as specified by federal legislation found in 15 U.S.C. §7001 enacted in the "Electronic Signatures in Global and National Commerce Act (ESIGN)" of June 2000.

In another embodiment, an EER consists of a transaction document and an EPM issued on the transaction document. It specifies the WHEN and WHERE. The transaction document records the details of the e-Mail stating which e-Mail server received it, the e-Mail address of the person who sent it, the e-Mail address of who is to receive it, the subject of the e-Mail and the hash value of the message body and any attachments. The EPM provides the timestamp on the transaction document. The EPM is an electronic timestamp token issued by a Time Stamp Authority (TSA) such as the U.S. Postal Service. According to RFC 3161 Titled "Internet X.509 Public Key Infrastructure Time-Stamp Protocol (TSP)", a TSA "creates time-stamp tokens in order to indicate that a datum existed at a particular point in time." Additionally, the timestamp "can then be used, for example, to verify that a digital signature was applied to a message before the corresponding certificate was revoked thus allowing a revoked public key certificate to be used for verifying signatures created prior to the time of revocation." Because the USPS issues the EPM, the transaction document is afforded legal protections as specified in 18 U.S.C. §1343, §2701, §2510, §2710, §1028, §1029, and 42 U.S.C. §408 (7)(b).

In another embodiment, an e-Mail server may perform operations as described below using the application of the present invention. First the e-Mail server will postmark an e-Mail message and send the postmarked copy to the recipients. The original is no longer needed and can be deleted. Subsequently, a Certificate of Mailing is created and mailed back to the sender. This signifies that the e-Mail server has received the e-Mail and has successfully processed it. Once the e-Mail server has received a successful indication of the delivery of the e-Mail to a recipient, a Certificate of Delivery is created for the address and sent back to the original sender as well.

In another embodiment, the following command will postmark then sign the e-Mail message.
  Emailidentity -c/pathto/config.ini-sign-postmark/pathto/
    email.eml -receipt/pathto/receipt.txt -out/pathto/new-
    email.eml There is no need to prepare the e-Mail message in order to perform this operation. A new e-Mail message is written to the location specified in the command. The original e-Mail message is left unchanged. Additionally, the receipt generated by the command is written out in order to generate the mailing and delivery messages. Only the -sign option is optional.

In another embodiment, the following command will create a Certificate of Mailing message from the receipt that is intended to be sent back to the sender of the original e-Mail message.
  Emailidentity -c/pathto/config.ini -sign-mailing/pathto/
    receipt.txt -out/pathto/newemail.eml The original receipt is left unchanged and a new e-Mail message is created in the specified location. The signature is optional.

In another embodiment, the following command will create a Certificate of Delivery message from the receipt that is intended to be sent back to the sender of the original e-Mail message indicating that a copy of the postmarked e-Mail has been successfully delivered to the e-Mail server that is handling the recipients e-Mail. The original receipt is left unchanged and a new e-Mail message is created in the specified location. The signature is optional.
  Emailidentity -c/pathto/config.ini -sign delivery/pathto/
    receipt.txt       -out/pathto/newemail.eml       -to
    recipient@email.address To Verify a Certificate of Mailing or Certificate of Delivery or Postmarked E-mail, the following command will read an e-Mail that contains either the entire e-Mail created by this application or a portion of it. It will generate a response that states the results of the verification. The e-Mail address of the requestor is specified.
  Emailidentity -c/pathto/config.ini -sign -verify/pathto/
    emailtoverify      -out/pathto/newemail.eml       -to
    requesting@email.address In another embodiment, the format of the certificate e-Mail messages and the graphics used in all cases may be customizable. Within the configuration file there may be settings that indicate what graphics to use for each operation. Generation of the certificate messages may be done in two steps: first, the creation of an XML document that contains the elements describing the message details, and second, a transformation using XSLT to create an HTML message body. If a signature is applied, it is typically applied as the last step of the message generation process.

In another embodiment, the Graphics section of the configuration file contains three directives: CertifiedMailGraphic, MailingConfirmationGraphic, DeliveryConfirmationGraphic. Each of these directives point to a JPEG graphic file that is used in the creation of the postmarked receipt for a specific operation.

In another embodiment, the CertifiedMailGraphic directive is used when creating the postmarked e-Mail message sent to the recipient. The postmarked receipt is inserted directly into this graphic. No modification of the graphic takes place prior to this operation. The graphic must be sufficient (often at least 95 KB) in size in order to accommodate the payload.

In another embodiment, the MailingConfirmationGraphic directive is used when creating a certificate of mailing, which is sent back to the original sender. The postmarked receipt is inserted directly into this graphic. Prior to the postmarked receipt being inserted into the graphic, the image is modified with text stating the details of the original e-Mail message. The area of the graphic altered is specified with the MailingWritableArea directive. The graphic must be sufficient (often at least 95 KB) in size in order to accommodate the payload.

In another embodiment, the DeliveryConfirmationGraphic directive is used when creating a certificate of delivery, which is sent back to the original sender indicating the delivery of an e-Mail to a recipient. The postmarked receipt is inserted directly into this graphic. Prior to the postmarked receipt being inserted into the graphic, the image is modified with text stating the details of the transaction. The area of the altered graphic is specified with the DeliveryWritableArea directive. The graphic must be sufficient (often at least 95 KB) in size in order to accommodate the payload.

In another embodiment, an XSLT file installed along with the system controls the format of the Certificate of Mailing, Certificate of Delivery, and Verification messages. This file contains transformation instructions that create an HTML file from an XML document created by the application. The directive, XSLTFile, is found in the section of the configuration file by operation type. An accompanying directive, Attachments, allows the embedding of graphic files within the e-Mail message to allow the use of <IMG> source links relative to the e-Mail message using "CID:value".

The XML document type structure generated by the application conforms to the specification shown in Section 5 of the attached Appendix.

In another embodiment, the EER consists of an outer XML document that has two elements, a transaction_element and an epm_element. The transaction_element contains the base64 encoded value of the XML formatted transaction document. The transaction document itself consists of which e-Mail server received the e-Mail message, the e-Mail address of who sent the e-Mail message, the e-Mail address of who is to receive the e-Mail message, the subject and the hash value of the message body and any attachments. The epm_element contains the base64 encoded value of the EPM generated against the value found in the transaction_element. In order to provide a user friendly face on the EER, it is base64 encoded, compressed and embedded within a copy of a graphic specified in the configuration file. The stegonographic process takes a graphic file, and using a method appropriate for the graphic, alters the image to include the bytes of the embedded data.

In another embodiment, all files output are MIME formatted. If MIME encoding is not present at the time of encoding, it is added. The EER is generated against the header of the message and the individual contents of the message and not to the overall formatted message. This means the message is broken apart into its parts and each part has a hash value generated against it separately. Any nested Multipart MIME messages are treated as a whole and are not broken down further. Once an EER has been created, the parts are reassembled to include the newly created EER graphic as the last attachment.

In another embodiment, if the -sign option is specified, the application applies an additional layer of formatting to the output. The configuration file specifies certificates and keys to use to sign the MIME encoded message generated in the previous step. Using these keys and certificates, a digital signature is created on the MIME message and an S/MIME formatted message is returned.

In another embodiment, it is expected that the message given to the application to process is the original message received by the SMTP mail server and contains all the appropriate headers. After processing the message and adding the necessary encoding, the output message will contain the same headers found within the original message but with additional headers indicating that this filter processed it.

In another embodiment, when verifying an e-Mail message that is an S/MIME encoded message, the application verifies the digital signatures applied using trusted X.509 certificates installed with the application. If a MIME encoded message is embedded within, the S/MIME contains an attachment with the MIME type of application/x-email-receipt-epm. The application extracts the attachment and verifies the attachment as an EER. The output of this operation is not another e-Mail message but rather an XML document that contains the results of the verify operation.

In another embodiment, network connectivity required by this application uses SOAP in order to request EPMs as well as to verify them. The IP address and port number used are controlled by the account with the USPS or other postal authority EPM management. These values are located within the configuration file.

In another embodiment, a stegonographic application is required to perform the postmark receipt embedding. It may use an application similar to the StegHide application. If this application is to be used, it can be obtained on the Internet at steghide.sourceforge.net In another embodiment, the following libraries are also required for the application to run:

| | |
|---|---|
| libgmime-2.0.so => | available from spruce.sourceforge.net/gmime |
| libxalan-c.so => | available from xml.apache.org/xalan-c |
| libxerces-c.so => | available from xml.apache.org/xerces-c |

While the invention has been described with reference to several exemplary embodiments, it is understood that the words that have been used are words of description and illustration, rather than words of limitation. Changes may be made, within the purview of the appended claims, as presently stated and as amended, without departing from the scope and spirit of the invention in its aspects. For example, the invention is readily adaptable to electronic transactions conducted in a networked computer environment other than the World Wide Web and the Internet. Although the invention has been described with reference to particular means, materials and embodiments, the invention is not intended to be limited to the particulars disclosed; rather, the invention extends to all functionally equivalent structures, methods and uses, such as are within the scope of the appended claims.

Computer Program

In greater detail, Section 6 of the attached appendix discloses source code for a computer program of another embodiment of the present invention that should be operating on a Postal e-Mail Service computer. Other required operating conditions include active connection to a communications pathway such as the Internet; power on state at both the client and the server; and an operating system such as LINUX, Microsoft Windows NT, Windows XP or Windows 2000 installed and operating on both the client and the server.

APPENDIX

SECTION 1

*Certificate of Mailing Message*
    This is an Official USPS Postmarked Mailing Receipt for the following email:
        Message Date: Mon, 12 Jan 2004 16:27:42 -0500
        Message Id: 004801c3d953$2ea42c50$0900a8c0@HYPERSPA530GAQ
        Postmark Serial: 10000ifl71
        Sender: mhaff@hypership.com
        Recipients: mhaff@goeaston.net
        Subject: test Certificate of Mailing Details
    Received: from psmtp.com (exprod5mx96.postini.com [12.158.34.84]) by mail1
    (8.12.8p1/8.12.8) with SMTP id i0CLcWXQ029481 for <mhaff@goeaston.net>;
    Mon, 12 Jan 2004 16:38:32 -0500 (EST) Received: from source ([69.2.175.214]) by
    exprod5mx96.postini.com ([12.158.34.245]) with SMTP;
    Mon, 12 Jan 2004 13:30:02 PST
    Received: by smtp.usmailreceipts.com (Postfix, from userid 501)
        id AB9D028C15C; Mon, 12 Jan 2004 16:30:02 -0500 (EST)

Date:    Mon, 12 Jan 2004 16:30:02 -0500
    From:    USPS Postmaster <postmaster@test.hypership.com>
    To:    mhaff@hypership.com, mhaff@goeaston.net
    Subject:    Mailing Receipt Message-ID: <20040112213002.GA30877@smtp.usmailreceipts.com>
    Mime-Version: 1.0
    Content-Type: multipart/mixed; boundary="X1bOJ3K7DJ5YkBrT"
    Content-Disposition: inline
    User-Agent: Mutt/1.4i
    X-pstn-levels:    (S: 3.3188)
    X-pstn-settings: 1 (0.1500:0.1500)
    X-pstn-addresses: from <postmaster@usmailreceipts.com> [db-null]
    X-UIDL: HIB"!-%X"!HN;!!9lE!!
    Status: U

*Source*
    Received: from psmtp.com (exprod5mx96.postini.com [12.158.34.84]) by mail1
    (8.12.8p1/8.12.8) with SMTP id i0CLcWXQ029481 for <mhaff@goeaston.net>;
    Mon, 12 Jan 2004 16:38:32 -0500 (EST) Received: from source ([69.2.175.214]) by
    exprod5mx96.postini.com ([12.158.34.245]) with SMTP;

Mon, 12 Jan 2004 13:30:02 PST
Received: by smtp.usmailreceipts.com (Postfix, from userid 501)
    id AB9D028C15C; Mon, 12 Jan 2004 16:30:02 -0500 (EST)

Date:    Mon, 12 Jan 2004 16:30:02 -0500
From:    USPS Postmaster <postmaster@test.hypership.com>
To:      mhaff@hypership.com, mhaff@goeaston.net
Subject: Mailing Receipt Message-ID: <20040112213002.GA30877@smtp.usmailreceipts.com>
Mime-Version: 1.0
Content-Type: multipart/mixed; boundary="X1bOJ3K7DJ5YkBrT"
Content-Disposition: inline
User-Agent: Mutt/1.4i
X-pstn-levels:    (S: 3.3188)
X-pstn-settings: 1 (0.1500:0.1500)
X-pstn-addresses: from <postmaster@usmailreceipts.com> [db-null]
X-UIDL: HIB"!-%X"!HN;!!9lE!!
Status: U --X1bOJ3K7DJ5YkBrT
Content-Type: text/plain; charset=us-ascii
Content-Disposition: inline
This is an Official USPS Postmarked Mailing Receipt for the following email:
Message Date: Mon, 12 Jan 2004 16:27:42 -0500
    Message Id: 004801c3d953$2ea42c50$0900a8c0@HYPERSPA530GAQ
    Postmark Serial: 10000ifl71
    Sender: mhaff@hypership.com
    Recipients: mhaff@goeaston.net Subject: test --X1bOJ3K7DJ5YkBrT
Content-Type: text/plain; charset=us-ascii
Content-Disposition: attachment; filename="postmark30831.txt"

----- BEGIN ENCODED USPS ELECTRONIC POSTMARK -----
H4sIAAAAAAAAAN1Y2a6jSrJ9vucrWv1q6TB54qi6WpmQYMCJzTy8HDHYYA
ZjG2wG9cd32nvvqr1P10u/
XoleS8hWmAwiMyLWWsG3fw519bfH4daemvM//s78Tv/9n99/+4b2+E8TCUjZ21//
/P7b//ztm7BVkG7/
udcEa/UdK0AWrKtsKTEnGmgDrgIgNgEYaBAmoMLMuYkZFuTMAf9xbyQAVQ
Foj/I8YTNelxGn286ARWXS
WYXTp4QO7YwJPTcPCzAERTBiGfW6KNWhqJeBZxBbpwS+3ribqg9txrYQGnY
9ePtoggBop88yHWJFEbQI
iCBDAsiUDW0DHWblNS9PMt/TEBiOBETlYKPtBSMQXcMgT1JdZ0ImBmsZM
A4SiBe7djlFqh5J3Q7IbnuY
6S4EiS2gRZWOMIw59YYNuhf6lw8N9abrMNNDGptOjN9sW9QNMfbMJvQUdOW
aeys4gFyB484Vt5Lq2I+HM ld0pFaBoWNCKWZ7GcO6LNhjJHQMulBEX5YCZ5mmjsQ0+2/osQoMoAu3NZ2ADxrUNG20xKD/2IthV+Z6j
tz2AchFiM+gl8BE784rdp13Ddnkn9Huam6gXf+wjlxzEHF9xisjGEL18QxNr2CY5FB1Wn7IFFn+eIYlS
ed0vuVPoK4MqgtPnPAgG8iTfrBLOBIHv0pHs3lO5KgNi29b6I7YfeJ7+mjskAbCDhQH6LCiFLEAg2+zz
kGoZILinNY4Bp3K2tzr6vhtH1Fah0mYlGaU+HuuJioXIv8d+WdqHPufIXWQWusmQ3a53t5xbnmO7WGnX
tqfQPknU7rooT8gcDzBx/YquLStuyjoKwIoP2tEXlnN17p wfVDTyi024aeTic1f488nDkyT86HyQnOZBbRIGRNF3rm5ZmLJ1a864yJ8PbzIvztT
Dv3XWd8tRGdsf5f
2xOewPCBf1pJfG3cjuR4TanGPf27ctWF5P5UlrpE0qvkHFbJCdp20SxwSXBHDOZ
6ga5Y+MBJI3/VFcNL
sewW6YzgJKk9n3nF1wW+evOZdz/Venj2YvfsN4vg50hyi+dzCBDJP0pAI4M75Zn
BMk44Rl60dUPnBd+B
nb4fWWHKJcYYuTWdnWEEzNnlWG34fC0Wk7WtC7mS2MtKHpWbqYez/tT5Kt
uYiE/i3t3KxQ2MVrluvMZM
tmF5WuuU/6iv3GaOvfOVJSorODDmeo2dWetgv045bxaEkoic20XaehB4Wl2kUjM0
bevOiyYo0kSQ8Eln
7W5IA1OZM97oeNbVLxIt5hbpcy+X2UV0km1VCC5pMsk65oWUelm8cgduSD0u
YyXW3gfocY0vdSBdlW5J
qPxup5vj41hIp44Gq2G20g6r1Unw7zJvUQMdA+dO3YLNjfB+d5PqqtyvncIU5m6z
Qtaa3VczLpyB9NoE
69lye+2OQXIzQ8QYUrJWJefcHkqu7pcHJ930EX86Dpluz8UscIgAkCFQAeHwKd0
TSVmcb015lje0tpQu
acLM5Hx75B4AioRrmdPuVkjaDobUCsXp9pSfxPD2MKfmkTXNSTVZ9biBu+U2
EjmUOO5m5WsT2tHrQrkC
fFXu0uURhpiy1SyehGM9+LdTFGxC10D9DveLaMfjRgvYBxidUB4UHXUaXSzjel
6dZgGyZ3TSzGUGP/ES
zJ+1mIo9glRvIMLJci/C2UvzWQClE5lJNk/ufcP2tfDSGTWGiSwIT5sjwV4RMGh7
OAQAA/zkAjLpQKIf
shvMnhowIRwRUNHGpBOxeWy5lEvHxTn0ePqFlcJLOxLKdKeYc8eAdactO1QhK
7VbgoGp5x4Dcl/kLYgu
1y+hxItEj9wT2azJ017xq8Yrfg9D41NcGH2KQRTEX8xcRLdnBtSpx25n2Gpp9ptL3
VVV363FlpAjWU8X
TE1fuYndM/f9uVNW3T1xXffgp4nn8JkWscXK4euJpHFjw2qNI6tStrfxsARz23oY0/
xusj3gnB07KlnM
BdGVr26WtadLKrgzByc/GpIxs+W1eMkbjcL15TLJqlSND6J7bjGNV3uzGNgtw2y
OXqDJAjiSOSOTaYLz
ZCLcHJvg/wX32f8d9ymV8Nz/Fy0JRMkQKrZDQ+su+Vbbjxbc93mQebuhmPQlVD
E6lKYNxV+c0w6D/uOc
pKemTT16EAuAPzAfuqZujPMRm0aP3rhCRH33vvc54YdgQbQLqfuE1Fix2wFDJ
DEJAt61Xny8NboWlECc
lP6HdhUzWp8c2suz/U/dU/Y70eB024wwSnrzOVP1AYRARp7RQLKGzGlEyi+n9P
7SteQjktbLjDch+Pwm
5E/2I8A3y+vbSJO3dasg2P1c99d4Rc0AcboWtaqgMh9u+WkXHO9CfKdOpKm18M
bnLDRWjyuhu5PgrIqE
vxaHeuxwoMDlRPjpkDwxgMzCqD+KP2d+mGPBdfGg2qD4mC02knuPSB2Gwos3
iRb40AdSq7xx6IXI7kEW
gfdj9mDe3k+YLtSVD54tUIuF5mP+KL7U0HuNv2pohCqZWaqkZqpQrp7vPjKDJpr
JyJ71Ign9XAR5I73e
3ZA8y9lnvVySuiG6avw5hyCA0K9nE5vqrnDVWediPLqLsmvzORo4Tz2uYSFAGv
xFU2f9kCWkr2OaXETX
hGskaX5E2zJBd7ZvKFVBlCCdYLCS95gjvS6TC1w28/9TZ0yGYCeol2xhqIFXb6rl
sNjs7lJC3zcmJJ1I 5r7N81ymggj9nswMwrzfAsURT6voOtsJl8dCWHCr2JnvSQXO7tU6ECT5ODQ4Plu
sLoS3HTJzVvbhWj8p
KzlTfRmBnjPR+5vFPxXxO0Otz+lYrapv1Cfzp8lJEf9OTP173nWX9g+K6k7loe2i+v
J7dO/yw7k7pVF3
+D1p6j/mc+5fLsP9eOD7ys9vLM2d6AhvD17/HNZ+Wn/7Rn169fn93783oVQeFQA
A
----- END ENCODED USPS ELECTRONIC POSTMARK -----
--X1bOJ3K7DJ5YkBrT—

SECTION 2

Certificate of Mailing Message
This is an Official USPS Postmarked Mailing Receipt for the following email:
    Message Date: Tue, 23 Dec 2003 17:05:59 -0500
    Message Id: 008b01c3c9a0$f350e060$0900a8c0@HYPERSPA530GAQ
    Postmark Serial: 10000if9fp
    Sender: mhaff@hypership.com
    Recipients: dcurtis@hypership.com
    Subject: The Really New e-Mail EPM Test Certificate of Mailing Details
X-From_: filter@test.hypership.com  Wed Dec 24 15:44:26 2003
Return-Path: <filter@test.hypership.com>
Received: from mx204.megamailservers.com (mx204.megamailservers.com [216.251.32.217])
    by mail41.megamailservers.com (8.12.10/8.12.9) with ESMTP id hBOKhnMZ027540;
<u>Wed, 24 Dec 2003 15:44:25 -0500</u>
Received: from smtp.usmailreceipts.com (test.hypership.com [69.2.175.214])
    by mx204.megamailservers.com (8.12.10/8.12.10) with ESMTP id hBNM7FIT069959;
    Tue, 23 Dec 2003 17:08:17 -0500 (EST)
Received: by smtp.usmailreceipts.com (Postfix, from userid 501)
    id D64DB28C15C; Tue, 23 Dec 2003 17:06:42 -0500 (EST)
Date:    Tue, 23 Dec 2003 17:06:42 -0500
From:    USPS Postmaster <postmaster@test.hypership.com>
To:    mhaff@hypership.com, dcurtis@hypership.com, cfahey@hypership.com
Subject:    Mailing Receipt
Message-ID: <20031223220642.GA8774@smtp.usmailreceipts.com>
Mime-Version: 1.0
Content-Type: multipart/mixed; boundary="zhXaljGHf11kAtnf"
Content-Disposition: inline
User-Agent: Mutt/1.4i

*Source*

> X-From_: filter@test.hypership.com  Wed Dec 24 15:44:26 2003
> Return-Path: <filter@test.hypership.com>
> Received: from mx204.megamailservers.com (mx204.megamailservers.com [216.251.32.217])
>     by mail41.megamailservers.com (8.12.10/8.12.9) with ESMTP id hBOKhnMZ027540;
> <u>Wed, 24 Dec 2003 15:44:25 -0500</u>
> Received: from smtp.usmailreceipts.com (test.hypership.com [69.2.175.214])
>     by mx204.megamailservers.com (8.12.10/8.12.10) with ESMTP id hBNM7FIT069959;
>     Tue, 23 Dec 2003 17:08:17 -0500 (EST)
> Received: by smtp.usmailreceipts.com (Postfix, from userid 501)
>     id D64DB28C15C; Tue, 23 Dec 2003 17:06:42 -0500 (EST)
> Date:    Tue, 23 Dec 2003 17:06:42 -0500
> From:    USPS Postmaster <postmaster@test.hypership.com>
> To:    mhaff@hypership.com, dcurtis@hypership.com, cfahey@hypership.com
> Subject:    Mailing Receipt
> Message-ID: <20031223220642.GA8774@smtp.usmailreceipts.com>
> Mime-Version: 1.0
> Content-Type: multipart/mixed; boundary="zhXaljGHfl1kAtnf"
> Content-Disposition: inline
> User-Agent: Mutt/1.4i --zhXaljGHfl1kAtnf Content-Type: text/plain; charset=us-ascii Content-Disposition: inline This is an Official USPS Postmarked Mailing Receipt for the following email:
<u>Message Date: Tue, 23 Dec 2003 17:05:59 -0500</u>
    Message Id: 008b01c3c9a0$f350e060$0900a8c0@HYPERSPA530GAQ
    Postmark Serial: 10000if9fp
    Sender: mhaff@hypership.com
    Recipients: dcurtis@hypership.com
Subject:    The Really New e-Mail EPM Test --zhXaljGHfl1kAtnf
<u>Content-Type: text/plain; charset=us-ascii</u>
Content-Disposition: attachment; filename="postmark8712.txt"
----- BEGIN ENCODED USPS ELECTRONIC POSTMARK -----
H4sIAAAAAAAAAN1YyY7jOrJd9/2KRm8NXE2e1KiuBilRoylbsubNhQZbsgbLg2
wN6I9vyplZlXm73uJt
HvDagGCDJkNBRsQ5J/jtn31d/fV5uN1Pzfkff2N+p//2z++/fUM7/leFBKTu7K9/fv/t
L3/9JmxUZNh/
7HRhv/qOVSAL+6u8V2NONJECrgIgYwIwUS+MQIOZcxMzLMiZA/5jbiQATQV
oh/I8YTPeYKVTaJsMLtwi sDEX2GAwPOMU2G6ltVUu9BwuKJzBGM0hFLM+KDBj2K0a+EbjKlUX2oy9R6
jfduDtowsCoJ0uywyIVVXQ
IyCCDAkgUxXaBgbMymtenmS+oyEwHQmIkMHmvRPMQHRNU0ad5jojsjBYy4
BxkECs2LXLqVL1Top7j2yw
g5nhQpDYAlpU6QDDmNNu2KQ7oXvZ0FfnuQ4DbWw5Hxob26Cuh6lvNaG3oCP
HylPZ6eUCBG+2sI1c13Yk
nLmyO6YCFM093McsT2M490VyJmRGjwt1wEXZY6aZxmhsg89jXRahXhSB/maT
nCTj2qaNNhiUH3sR7Kp8
j9HbHkC5CLEVdBL48J15+e7Trmm7vBP6Bo0t1Ik/9pFLDmKOLz9FZGOIXrahhX
Vsq6MhOqwxZgss/jxD
4qX6mi+5Y+irvSaC0+c4CcbyJN+qEs4Cge/Skew+UrkqAzK2qY1nbAvwPP45dkgC
YAsLE3RZUApZgECm
7PKQujNAcE9rHANO42xvdfR9N46ojUqlzUoyS2M41iMVC5H/iP2wdA5dzhvbyC
oMiyG7XW9vObc8x3ax
0q/3jkK7JNHa66I8Iws4wMT1E7rc7+OmrKMArPjgPvjCcq7NnfLcQ3zPT8M8vrP1
wu0uBQskjxVpH1ZD
VSSRGpd1bfFK4wigQwBEeMAi6MTp7C2SnaZCQaB2U8ZO8VeshGQb+Jnl0lMc
TFliUjmv4rN1CWWJDveL
ImbpTjQDTW9CNX8mxnQu0ARiliEINtGhCKR6E99no87d7velflqV57gV0Co8rPy
NepuV83BIakefPQRj
vhVujv0MC7G6c+maYm4KHRv1HO7urFpS1EF2Q5qWRitdzg0UVZfCXPsm1vqM
Mp6afDS83UYNZ1R7Om2e
ds5pC2qoQSJK14BFmVpQjj1v0iBYR40CqLSSlmLIVG0ZMpG4gOP2St3C0u7XiR
+rilLwfn4P+Z2OB388
DRc64o/mVmeFdsye6wGABt5XO90BzZ0r6C3nGcKB2+fp9SHO2jVvMeKTkTJzU
I8+H9EjukqPKqS1Bbic
9xSxL/Fd1i5Ke5d3D+twjHXucE5L6u4sizlstGybXr0NSAxXP+z13Y3HOUpmm2PS
Z5lMcE2FR6BCYMMV
VpxPNUXqrnLtTzWjkprZhn6SeR4/RJ+wBfZfsYXU9ObNRmND6YUHvWSTN7z
G7raIfsbfmuJvowjD7KPG
LNc1TgeAr5olcA1VSXvGnEmw72hNGAD39y3o1AiaQubbE/Z8rkHcE/z6lEcJQQv
8Gbs1KCIPQrPVTnly
WO/XkbJLF5vFkxk6MfC0Jz+C5KtNpxf7xMAinnBqJE9nFJj1il/V8p7sxGGpeM/M
OMa+WivnjM+nWeWk
ArPcHHXpeDp6Gm21HQSuoR+cbEUNAauhXOvKinVOj/Ri6Zeg3kbjocgse70rnAl
9XvGq6BTOPX++C/dI
E4RNgvw1mJVBaMTBel6LvLfT7eVh5ueHbt5eS2VU8WU+NA8YnHzdOHPK1pI1
YcveLxIT5OLVCt/Zbnyj
vlDjxJV7ZlnI+sGVqnb/eq5CQ8YuoiAI0cSZ+BecqUKcBZufa0oTmPuM1HQOyX+
KTTjOKie+lYXTXQam
CXOp1AmmdKr91RaEFgcZBbOKv9mp9NndZgHs3eejhdeMpCYA/XENMxsXoM
MjIlxCMKkArCGCB+GXBYmV
TvgTZCTXeZVgClBlsKsrtT89GlVmLqo8YFV+/oJDqyl/XryT48T1FpdUdktVMugJ
15MBmjFHfntd5rDu
kNZVQfI5wDB4W9Pj3Xs+E76h3+e4hAdxh813LhouiNhi4j10kjPhl5d96xJ7TuZwV
h770A59jSWckzn0 fLm1NUTwlt2Kqa8XBD7euNdRX9xrHC2vrwLOGmJ2cQkY/uVf7ElDxPDvdrQjjg
QB1gnRF9aTxElk9Q99
gVQM6M/1QkqFxFLp/hMb9k6nfmiFvnfjuqJDz3z5TPYwqhJ8JpP/wpv/kWdU2Mo6
KfvgYP7F0SoiHL3/
scd+I4Lrh55Qafceegad1Pwj8nDmyDw5HyYnOJPtiQYha9rQsy5TLCaseNcZI+Ht6S
H87Yxb911nfB0j
OmP9f7YnPIL+A//0kthS3JbEeEgJxk32XblqQzI/laU2kYwqOYdVcoK2XTQLXJod
FoO5UaArFj5w0sxf
ecXwUiy7RaoQjCS55zMv/9rA124+826nWvdTLbZTve0Jfg4ktng+hwCR+KMENDJ
4UJ4VLOOEY+TFvW7o
vOBbsDV2AyuMucSYA7emszOMgDW7HcuFz9diMe43dSFXEntZyYN6s4xw1p1a
P2V7C/FJ3LkbubiBYV+u
G6+xkk1YxtYS5T/rK6fMsXe+kup0ggNjrdfYmd0d7Ncp582CUBKRc7tIGw8CT6+
LVGr65n5350UTFGki
SPhksHbbp4GlzhlvcLz91S8SpeYW6bSXy+wiOsmmKgSXFJm0P+aFlHpZvHJ7rk8
9LmMl1t4F6HmNL3Ug
XdV2Saj8YafK8XkspFNLg1U/W+mH1eok+A+Z31M9HQPnQd0C5UZ4v71JdVXu
1k5hCXO3WaH9mlWoWRvO
QhptgvVsubm2xyC5WSFiTClZa5Jzvh9Kru6WbydVuog/HfvMsOdiFjhEAMgQaIB
w+JjuiKQszremPMsK
rS+lS5owMznfHLkngCLhWua0vRWSvoUhtUJxujnlJzG8Pa2xeWZNc9IsVjsqcLvc
RCKHEsdVVr4+oi29
LtQrwFf1IV2eYYgpW8viUTjWvX87RYESuibqbrhaRFseN3rAPsHghHKvGqjV6W
IZ1/PqNAuQPaOTZi4z
eMJLMJ9yMRU7BKnORIST5U6Es5fm2wOUjqQnUSbufcP2tfDSGTWGiSwI05gj
wU4VMLh3sA8AbnjiAtLp
QKIfshvMJg2YEI4IqEix6Ersnhsu5dJhcQ49nn5hpfDSjkR3uGPMuYRI3XHD9lXISv
cNwcDUc48BmRd5
C6LljUso8SLRI49Etmrytpf/mvny38PQ/OQXRp98EAXxFz0X0e2ZCQ3qud2atlZan
XKp26rq2rXYBnIk
G+mCqekrN7I75rE7t+qqfSSu6x78NPEcPtMjtlg5fD2SMCo2rNY42lfq5jYclmBu75/
mOH9YbAc4Z8sO
ahZzQXTlq9t+v6NLKngwByc/mpI5s+W1eMkbncL15TLKmlQNT6J7bjGNVzur6N
kNwyhHL9BlARxJn5HJ
NMF50hEqxyb4r+A++3/HfWolTPv/oiWBKJlCxbaov7tL/q7vhj3cdXmQedu+GI0l1
DA6lJYNxV+c0xaD
7uOcpEnTph7diwXAH5gPXcswh/mALbNDb1whoq593/uc8EowIHqF5H1CcqzYbo
EpEp8EAW/3a7F5aTQs
qIE4qt0PHWoHtDE6tJdnux+6h/CMUZicYVsRRklnTT1VF0AIZOSZDcRiRvo0IuU
Xm26bTbqJfERSepn5
JgSnbwEuyH4E+Dby+jad4H1dd338XPdnf0XdFCiMmHrm7Ti24mjTaSC3jNjcFB66
l/Wm9TyErGbXTxbw
2pl74nC2EZsUBypcjoSfDsmEAaQXRt1R/NnzwxwLrot7zQbFR2+hSO4jInkYCi/eJ
FrgQx9Id/WNQy8B
6/SyCLwfvQfzdj9hudBQP3i2QHcsNB/9R/Elh95z/JVDA9Riz1IlNVOFcjXdfWQmT
TSTmU35IOndXAR5

I73ubkic5eyzXi5J3hBdNfzsQxBA6H/oTc5LR+UdY77gHuuC2sttnjHpaYh62xYgDf6kqbOuzxJS1zFN
HqJrwjWSdD+ibZmgO9s1IKYiSpBOMFjJO8yRWpfJAy7K/P/VGZMm2PguotzR0bMRkpTKQznKi8Ef9i7K
5tO9lTKdy1gQod+RnkGYdxugOtt67e01vK4I5Q4ni9rKndwRreG7a0GSD6u90jTP5sQ4rBqUG3++kc0w
1R3pG/WlBZp6ovebxT9U8TtDk8/pyB8v36hPw586J1X8w7GM73nbXu5/p6j2VB/ubVRffo8ebX44t6c0
ag+/J0399/mc+5fLcD9e+L7y842ltRUd4e3F65/N2s/R375Rn64+v/8bmWz0xh4VAAA=
----- END ENCODED USPS ELECTRONIC POSTMARK -----
--zhXaljGHfl1kAtnf—

SECTION 3

Delivery Confirmation Message

This is an Official USPS Postmarked Read Receipt:
    Message Date: Mon, 22 Dec 2003 13:46:35 -0500
    Original Mail ID: 010a01c3c8ba$f4a32270$0900a8c0@HYPERSPA530GAQ
    Postmark Serial: 10000if8q6
    Sender: MAILER-DAEMON@usmailreceipts.com
    Subject: Read: Fw: test Fw: test Delivery Confirmation Details
X-From_: filter@test.hypership.com Mon Dec 22 13:42:20 2003 Return-Path:
<filter@test.hypership.com> Received: from smtp.usmailreceipts.com
(test.hypership.com [69.2.175.214])
    by mail47.megamailservers.com (8.12.10/8.12.9) with ESMTP id hBMIgJ0S026534
    for <mhaff@hypership.com>; Mon, 22 Dec 2003 13:42:19 -0500
Received: by smtp.usmailreceipts.com (Postfix, from userid 501)
    id 2CC0D28C15E; Mon, 22 Dec 2003 13:42:19 -0500 (EST)

```
Date:     Mon, 22 Dec 2003 13:42:19 -0500
From:     USPS Postmaster <postmaster@test.hypership.com>
To:       mhaff@hypership.com
Subject:  USPS Postmarked Read Receipt: Read: Fw: test Fw: test
          Message-ID: <20031222184219.GA3863@smtp.usmailreceipts.com>
          Mime-Version: 1.0
          Content-Type: multipart/mixed; boundary="FcuugMFkClbJLl1L"
          Content-Disposition: inline
          User-Agent: Mutt/1.4i
```

Source
X-From_: filter@test.hypership.com Mon Dec 22 13:42:20 2003 Return-Path: <filter@test.hypership.com> Received: from smtp.usmailreceipts.com (test.hypership.com [69.2.175.214])
 by mail47.megamailservers.com (8.12.10/8.12.9) with ESMTP id hBMIgJ0S026534
 for <mhaff@hypership.com>; Mon, 22 Dec 2003 13:42:19 -0500
Received: by smtp.usmailreceipts.com (Postfix, from userid 501)
 id 2CC0D28C15E; Mon, 22 Dec 2003 13:42:19 -0500 (EST)

Date: Mon, 22 Dec 2003 13:42:19 -0500
From: USPS Postmaster <postmaster@test.hypership.com>
To: mhaff@hypership.com
Subject: USPS Postmarked Read Receipt: Read: Fw: test Fw: test
Message-ID: <20031222184219.GA3863@smtp.usmailreceipts.com>
Mime-Version: 1.0
Content-Type: multipart/mixed; boundary="FcuugMFkClbJLl1L"
Content-Disposition: inline
User-Agent: Mutt/1.4i --FcuugMFkClbJLl1L Content-Type: text/plain; charset=us-ascii Content-Disposition: inline This is an Official USPS Postmarked Read Receipt
 Message Date: Mon, 22 Dec 2003 13:46:35 -0500
 Original Mail ID: 010a01c3c8ba$f4a32270$0900a8c0@HYPERSPA530GAQ
 Postmark Serial: 10000if8q6
 Sender: MAILER-DAEMON@usmailreceipts.com Subject: Read: Fw: test Fw: test --FCuugMFkClbJLl1L
Content-Type: text/plain; charset=us-ascii
Content-Disposition: attachment; filename="readreceipt1_3812.eml"
Return-Path: <MAILER-DAEMON@usmailreceipts.com>
Received: from mail33.internethostingsolutions.com (mail33.internethostingsolutions.com [69.49.100.33])
 by smtp.usmailreceipts.com (Postfix) with ESMTP id 4DF5728C15B
 for <def1a143-5ee0-42a6-a965-7abe30e169c7.readreceipt@test.hypership.com>; Mon, 22 Dec 2003 13:42:01 -0500 (EST)
X-Authenticated-User: dcurtis.hypership.com
Received: from HYPERSPA1TZ9DH (gateway.hypership.com [69.2.175.213])
 (authenticated bits=0)
 by mail33.internethostingsolutions.com (8.12.10/8.12.9) with ESMTP id hBMIfxMT025781 for <def1a143-5ee0-42a6-a965-7abe30e169c7.readreceipt@test.hypership.com>; Mon, 22 Dec 2003 13:42:00 -0500 (EST)

| From: | "dcurtis" <dcurtis@hypership.com> |
| To: | "Maurice Haff" <def1a143-5ee0-42a6-a965-7abe30e169c7.readreceipt@test.hypership.com> |
| Subject: | Read: Fw: test |
| Date: | Mon, 22 Dec 2003 13:46:35 -0500 |

Message-ID: <003401c3c8bb$ed3048f0$0700a8c0@HYPERSPA1TZ9DH>
MIME-Version: 1.0
Content-Type: multipart/report;
    report-type=disposition-notification;
        boundary="----=_NextPart_000_0035_01C3C892.045A40F0"
X-Priority: 3 (Normal)
X-MSMail-Priority: Normal
X-Mailer: Microsoft Outlook IMO, Build 9.0.2416 (9.0.2910.0)
X-MimeOLE: Produced By Microsoft MimeOLE V6.00.2800.1106
Importance: Normal
In-Reply-To: <010a01c3c8ba$f4a32270$0900a8c0@HYPERSPA530GAQ>

This is a multi-part message in MIME format.
------=_NextPart_000_0035_01C3C892.045A40F0
Content-Type: text/plain;
    charset="iso-8859-1"
Content-Transfer-Encoding: 7bit Your message

| To: | Dan Curtis |
| Subject: | Fw: test |
| Sent: | 12/22/2003 1:39 PM | was read on 12/22/2003 1:46 PM.
------=_NextPart_000_0035_01C3C892.045A40F0
Content-Type: message/disposition-notification
Content-Transfer-Encoding: 7bit
Reporting-UA: HYPERSPA-1TZ9DH; Microsoft Outlook IMO, Build 9.0.2416 (9.0.2910.0)
Final-Recipient: rfc822;dcurtis@hypership.com
Original-Message-ID: <010a01c3c8ba$f4a32270$0900a8c0@HYPERSPA530GAQ>
Disposition: manual-action/MDN-sent-manually; displayed
------=_NextPart_000_0035_01C3C892.045A40F0--
--FCuugMFkClbJL11L
Content-Type: text/plain; charset=us-ascii
Content-Disposition: attachment; filename="postmark3812.txt"
----- BEGIN ENCODED USPS ELECTRONIC POSTMARK -----

H4sIAAAAAAAAAN1Y2Y7rOJJ9nvqKRr8aKK3eGrdvg5So1ZStfXkpaLEla7G8yN
aC+fihnZmVmdX3pV8G mDEg2KDJUJARcc4J/vjX0NR/e+yvt2N7+uffmd/pv//r528/0A7/YSEBqTvn+58/f/uv
v/0QNioynD92 umAvf2IVyIJ9kW014UQTKeAiADImABMNwgQ0mLtXMceCnLvg3+bGAtBUgH
aoKFI2X2MfMZGs1VGZlXiq
aywCJpxy1nDcHjeIjpqQwb5WGg2aIgf3hm/ykdOpYWC0nlL3kcM4NkLDtgdvH10
QAO32eW5ArKqCHgMR
5EgAuarQDjBgXl2K6iivexoC05WACBls3nrBDEXPNGXUa547IQuDlQwYFwnEit
N4nCrVj7S5DcgBO5gb
HgSpI6B5nY0wSjjtik26F/qXDR31lucy0MGW26O3sQ3qB5gFVhv5czp2rSKT3UEu
QfhmCzvI8xxXwrkn
e1MmQNG0oZ2waxpDPhAdMJIZAy7VEZfVgJn2OUZjB3wd6/MYDaII9DeboQM
YzzEdtMGg+tiL4NTVe4ze
9gCqeYStsJfAh+/My/eA9kzHW7tRYNDYQr345z4KyUXM4eWniBwM0cs2tLCOH
XUyRJc1pnyOxc8zJF6q
r/mSN0WBOmgiOH6Ng2AiXwqsOuUsEAYeHcvePZPrKiRjm8Z4JI4AT9NfY4ckA
LawNEGfh5WQhwjkyq6I
qBsDBO+4wgngNM7xl4cg8JKY2qhU1i4lszLGQzNRiRAH9ySIKnffF2tjG1ulYTFk
t6vtteAWp8Qpl/rl
1lNol6Zad5lXR2SNe5h6QUpXtp20VROHYLkOb2MgLHiNd6vTAPGtOI58cmObu
defSxZIPivSAazHukxj
NamaxlorrSuAHgEQ45Hkey8+z94i2WkqFARq/8zYZ3wUCyHZAUFuefQzDqYsM
Zlc1MnJOkeyREf2vExY
uhfNUNPbSC0eqfE8F2gCMc8RBJt4X4ZSs0lus0nnrrfbQj8uq1PSCWgZ7ZfBRr3O
Kj4a08bVZ3fB4LfC
1XUeUSnWNy5bUcxVoROj4eHuxqoVRe1lL6JpabKyBW+guD6X5iowsTbklPHQ5
IPh7zZqNKO643HzcApO
m1NjA1JRuoQsytWSch2+zcJwFbcKoLJaWogRU3dVxMTiHE7bC3WNKmdYpUG
iKkq5DopbtN7peAym43im
4/XB3Oqs0E35YzUC0MLbcqe7oL1xJb3lfEPYc3aRXe7irFutLUZ8MFJujuohWMd0
ii7SvY5oLQUG5z9E
HEjrPu/mlbMr+ru1PyQ6tz9lFXVzFyUPWy3fZhd/A1LD0/e2vruucYHS2eaQDnkuE
1xT4QGoEDhwiRX3
S02Ruqs950vNqKRmtlGQ5r6/HuMv2AKH79hCanrzZqN1oPTCg0FyyBteYzdHRJ/
xt57xd1CMYf5RY5bn
GaY7wlfNEriGqqQ9Es4k2HewnhgA7dsW9GoMTSEPnCf2fK1BPBD8+pJHKUEL/
BW7NSgiH0Kr5o9iv1F4
bsmLdru0nVlXFenMzg0HpN9tuoM4pAYW8RtOOTmNSzT55a9q2Ya5kDYRI1aO
YF3aC8r6s93dDbEku3ZC
TtnIvCSvnKHo8Kg7cJGdz+qO6rDmVHr8UFh/vQ8WAQMuLcMdI1abws4tJ3vluk3
WSstaYoz74kznyfbh
PVYeX/Kr3d7KsS0ZZ2ztKuNUzSt2T/NBcseLqVDMThuPe+Z4oEd0XF+cJoz2VUz
gEpuPd7YBP6hv1Pjk
ShtZHrL+5EpV6/Jv5yq0ZOw8CYIQY8KZ+BecqUKch5vPNZUJTDsnNV1A8p/iEI
6zqiffysLxJgPThIVU 6QRTetX5bovEazdwcMxWmS/YC582pP2YnK9FzB6dXiUgNOxJ/Tq4BD2eEOESd
diKJolVeN+SeJFY6YQ/
QU5yfa0STAGqDHbNwYxWTavKzFmVR6zKj19waP3MnxfvFDj1/Pk5k71KlQz6ie
vpCM2EI7/9PndZb8ya
uiT5HGIYvq0Z8O49nwnf0O9zPOIX7rH5zkXjGRFbTGJDNz0RfnnZt86J7+YuZxV
JAJ0o0FjCOblL84ut
oyGCt+xWDAe9JPDxxr2u+uJe42D5Qx1y1piw83PIrF/+Jb40xsz63Y52wLEgwIZwb
W49SJxEVv/QF0jF
gP5aLxCaJJZK/+/YYLu9+qEVhsFLmpqOfPPlM9nDpErwkT79F978j32jxlbeS/kHB
69fHK0iwtH2n3sc
NiK4fOgJlfZukW/QabO+xz7OXXlNzocpCM7kNtEgZE0X+db5GYsnVrzrjInw9vM
h/O1OW+9dZ3wfIzpj
9b+2JzyB4QP/9IrYUryOxHjMCMY97Xty3UVkfiZLXSoZdXqK6vQIHads57gyeyy
GvFGiCxY+cNIsXnnF
rKVE9spMIRhJci9gXv51YaBdA+bdTr0anrXYPevNJvg5kthinocAkfijFLQyuFO+FS
6SlGPk+a1p6aJc
d2Br7EZWmAqJMUduRecnGANrdj7UyrpYiQSTNk0p1xJ7XsqjerWMaNYfuyBjB
wut06T3NnJ5BaNdrVq/
tdJNVJ1XEhU8mgun8Ng/XViissI9Y61W2J3dXBw0GefPwkgSkXs9SxsfAl9vykxqh
/Z2I0jXhmWWChI+
GqzTDVloqTzjj65vX4Iy1RNunj33cp6dRTfd1KXgkSKT7ENRSpmfJ0tv4IbM53JW
Yp1diB6X5NyE0kXt
FoTK706mHB6HUjp2NFgOs6W+Xy6PQnCX1zY10Alw79Q1VK6E97ur1NTVbu
WWlsB77RLZK1ahZl00A9ml
DVezxebSHcL0akWIMaV0pUnu6bavuKZf7N1M6eP18TAQnuHFPHSJAJAh0ADh
8CnbEUlZnq5tdZIVWl9I
5yxlZnKxOXAPAEXCtcxxey0lfQsjaomSbHMsjmJ0fVhT+8jb9qhZrHZQ4HaxiUU
Opa6nLAN9Qlt6VaoX
gC/qXTo/oghTjpYnk3BohuB6jEMl8kzUX3E9j7dr3Ooh+wCjG8mDaqBOp8tF0vD1
cRYiZ0anLS8z+ImX
gH/mYib2CFK9iQgny70IZy/NZwOUTaQnUZ7c+4btK+GlMxoMU1kQnmOuBHtV
wODWwyEEGDx5BJFOBxL9
kF9h/tSAKeGIkIoVi07F9rHhMi4b56fIX9MvrBRe2pHoDm9KOG8MWW/asEMdsd
JtQzAw871DSObF/pzo
cuMcSWuR6JF7KlsNedvLf818+e9jaH7xC6MvPoiC+Iuei+j23IQG9dhuTUerrF45N1
1d991K7EI5lo1s
zjT0hZvYHXPfnTp12d1Tz/P2QZb67jrXY7ZcuutmImFUHFivcGzX6uY67heAd+yH
OfF3i+0B527ZUc0T
Lowv6/pq2zu6osI7s3eLgymZM0deieei1SncnM+TrEn1+CC655rQeLmzyoHdMIxy8
ENdFsABk5qXOYLz
pCNUDm34/4L7nP+M+9RaeO7/m5YEomQKNduh4eYt1jd9N9pw1xdh7m+HcjIW
UMNoX1kOFH9xTlsM+o9z
kp6aNvPpQSwB/sB86FmGOfIjtswevXGFiPrufe884YdwTrQLyfuU5Fi53QJTJD4JA
t5aBA5eGg0LaihO
av+pQ0PamFzaL/Ldp+6pBqM0OcOxYoza3gZEs/UhhEBGvtlCLN5In0ak/Fze3/Onb
iIfEexAbr4Jwee3

```
i4gWUCiyJwG+jb6+TVl9X3uNtp9r/+qzqJvCAySDMad3vU/0bLm3702+KAcnEEG
rP9p7v9TVxu3ayzS7
s8LG4njOWbk4VOGC6EmwT584QPph1B/Ez74fFljwPDxoDig/+gtF8u4xycVIeHEn
0QMfGkG6qW88eg5Z
d5BF4P/ZfzBvdxSWBw31g2tLdMNC+9GDlN/y6D3PX3k0Qo30LXXaMHUk18/7j
9ykiW4y82dOSHrPi6Bo
pdf9DYm1/E0zVyR3iLYaP3sRBBD6dX/iyKzl0vcirukZNvuZC8O85lF6NrlJgDT4i6
7O+yFPQZ8nNHmI
tolWSNKDmHZkgvBs31KaiihBOsJwKe8wR+pdJg84K/z/qTMmjbBLidO8d4BwS2
6h29DIaE9t+FAkIVaf
d1fK81ymkoj9nvQNAt9vgOrGMwbtwTkVHpG4OHpQ3J93YoyojKcFCZ5GeDgGe
LfT1rHrm0UbSbS9HKzZ
7Qf1rQ169kXvt4t/qOJPhiaf42F1Wfygvgx/6Z5U8Q/XMn4WXXe+/YOiumOzv3Vxc
/49vnfF/tQds7jb
/562zT94nvtvj+H+fOH7yq+3ltZWdIW3F68+G7bP0d9+UF+uP3/+D3ODLm4iFQA
A
----- END ENCODED USPS ELECTRONIC POSTMARK -----
--FCuugMFkClbJLl1L—
```

SECTION 4

```
# Localize these.
INSPECT_DIR=/var/spool/filter
POSTMARK_HOME=/usr/local/postmarking
JAVA_HOME=/usr/java/j2sdk1.4.1_01
SENDMAIL="/usr/sbin/sendmail.postfix -I"
WORKINGFILE="$INSPECT_DIR/receipt.$$"
MAILFILE1="$INSPECT_DIR/mail$$.eml"
MAILFILE2="$INSPECT_DIR/mail2_$$.eml"
RECEIPTFILE1="$INSPECT_DIR/readreceipt1_$$.eml"
RECEIPTFILE2="$INSPECT_DIR/readreceipt2_$$.eml"
POSTMARKFILE="$INSPECT_DIR/postmark$$.txt"
TEMPLATE=".readreceipt"
DOMAIN="@usmailreceipts.com"

AUTHENTIDATE_USER="mlarson"
AUTHENTIDATE_PWD="hypership1"

CLASSPATH="$POSTMARK_HOME/lib/archiver.jar:$POSTMARK_HOME/lib/epmsdk.jar:$
POSTMARK_HOME/lib/jcert.jar:\
$POSTMARK_HOME/lib/bcmail-jdk13-119.jar:$POSTMARK_HOME/lib/jce-jdk13-
119.jar:$POSTMARK_HOME/lib/jnet.jar:\
$POSTMARK_HOME/lib/jsse.jar:$POSTMARK_HOME/lib/asn1rt.jar:$POSTMARK_HOME/l
ib/jcsi_pki.jar:\
$POSTMARK_HOME/lib/tti.jar:$POSTMARK_HOME/lib/AuthentiDateSoap_client.jar:
$POSTMARK_HOME/lib/webserviceclient.jar:\
$POSTMARK_HOME/lib/stego.jar:$POSTMARK_HOME/lib/webreceipts.jar"
# Exit codes from <sysexits.h>
EX_TEMPFAIL=75
EX_UNAVAILABLE=69
```

```
EX_NOPERM=77

# Clean up when done or when aborting.
Trap "rm -f $MAILFILE1" 0 1 2 3 15
trap "rm -f $MAILFILE2" 0 1 2 3 15
trap "rm -f $RECEIPTFILE1" 0 1 2 3 15
trap "rm -f $RECEIPTFILE2" 0 1 2 3 15
trap "rm -f $WORKINGFILE" 0 1 2 3 15

# Start processing.
Cd $INSPECT_DIR || { echo $INSPECT_DIR does not exist; exit $EX_TEMPFAIL;
}
# save the message into a file.
Cat > $MAILFILE1

TO_ADDRS=`sed -n -e '/To:/I,/:/{ :grab; /,$/{; N; s/\n/ /; s/\t/ /; b
grab; }; s/\n/ /; s/\t/ /; p; Q; }' $MAILFILE1 | \
                awk 'BEGIN {FS=","} { for(n=1; n<=NF;n++){ match($n,
/((<)([[:alnum:]]|[:punct:]]+@[[:alnum:]]|[:punct:]]+)(\>)\s*)+/, arg);
printf " "arg[3]; }}'`
ISRECEIPT=`echo "$TO_ADDRS" | egrep -I
"$TEMPLATE$DOMAIN|$TEMPLATE$DOMAIN2"`
```

SECTION 5

```
<!ELEMENT usmailreceipts
(mailingconfirmation|deliveryconfirmation|verification)>
    <!ELEMENT mailingconfirmation (postmark)>
    <!ELEMENT deliveryconfirmation (postmark)>
    <!ELEMENT verification (signature,postmark)>
    <!ATTLIST deliveryconfirmation to CDATA #REQUIRED>
    <!ATTLIST verification type (postmark|attachment|original) #REQUIRED>
    <!ELEMENT postmark (emailtransaction)>
    <!ATTLIST postmark validity (absent|invalid|valid) #REQUIRED>
    <!ATTLIST postmark serial CDATA #IMPLIED>
    <!ATTLIST postmark timestamp CDATA #IMPLIED>
    <!ELEMENT emailtransaction (sender,to,cc?,bcc?,subject,messageid,date)>
    <!ELEMENT sender (#PCDATA)>
    <!ELEMENT to (address+)>
    <!ELEMENT cc (address+)>
    <!ELEMENT bcc (address+)>
    <!ELEMENT address (#PCDATA)>
    <!ELEMENT subject (#PCDATA)>
    <!ELEMENT messageid (#PCDATA)>
    <!ELEMENT date (#PCDATA)>

<!ELEMENT signature (description?,signers?)>
    <!ATTLIST signature validity (absent|invalid|valid) #REQUIRED>
```

```
<!ELEMENT description (#PCDATA)>
<!ELEMENT signers (signer+)>
<!ELEMENT signer (#PCDATA)>
<!ATTLIST signer created CDATA #REQUIRED>
<!ATTLIST signer expires CDATA #REQUIRED>
```

SECTION 6

```
#!/bin/bash
# Localize these.
INSPECT_DIR=/var/spool/filter
POSTMARK_HOME=/usr/local/postmarking
JAVA_HOME=/usr/java/j2sdk1.4.1_01
SENDMAIL="/usr/sbin/sendmail.postfix -i"
WORKINGFILE="$INSPECT_DIR/receipt.$$"
MAILFILE1="$INSPECT_DIR/mail$$.eml"
MAILFILE2="$INSPECT_DIR/mail2_$$.eml"
RECEIPTFILE1="$INSPECT_DIR/readreceipt1_$$.eml"
RECEIPTFILE2="$INSPECT_DIR/readreceipt2_$$.eml"
POSTMARKFILE="$INSPECT_DIR/postmark$$.txt"
TEMPLATE=".readreceipt"
DOMAIN="@usmailreceipts.com"
DOMAIN2="@test.hypership.com"
READRECEIPTINDICATORS="Disposition-Notification-To|Return-Receipt-To|X-Confirm-Reading-To"
```

MAILCLIENT="/usr/local/bin/mutt"

```
MAILCLIENTCONF="$POSTMARK_HOME/conf/mrcb.muttrc"
AUTHENTIDATE_USER="mlarson"
AUTHENTIDATE_PWD="hypership1"

CLASSPATH="$POSTMARK_HOME/lib/archiver.jar:$POSTMARK_HOME/lib/epmsdk.jar:$POSTMARK_HOME/lib/jcert.jar:\
$POSTMARK_HOME/lib/bcmail-jdk13-119.jar:$POSTMARK_HOME/lib/jce-jdk13-119.jar:$POSTMARK_HOME/lib/jnet.jar:\
$POSTMARK_HOME/lib/jsse.jar:$POSTMARK_HOME/lib/asn1rt.jar:$POSTMARK_HOME/lib/jcsi_pki.jar:\
$POSTMARK_HOME/lib/tti.jar:$POSTMARK_HOME/lib/AuthentiDateSoap_client.jar:$POSTMARK_HOME/lib/webserviceclient.jar:\
$POSTMARK_HOME/lib/stego.jar:$POSTMARK_HOME/lib/webreceipts.jar"
# Exit codes from <sysexits.h>
EX_TEMPFAIL=75
EX_UNAVAILABLE=69
EX_NOPERM=77

# Clean up when done or when aborting.
trap "rm -f $MAILFILE1" 0 1 2 3 15
trap "rm -f $MAILFILE2" 0 1 2 3 15
trap "rm -f $RECEIPTFILE1" 0 1 2 3 15
trap "rm -f $RECEIPTFILE2" 0 1 2 3 15
trap "rm -f $WORKINGFILE" 0 1 2 3 15

# Start processing.
```

```
cd $INSPECT_DIR || { echo $INSPECT_DIR does not exist; exit $EX_TEMPFAIL;
}
# save the message into a file.
cat > $MAILFILE1

TO_ADDRS=`sed -n -e '/To:/I,/:/{ :grab; /,$/{; N; s/\n/ /; s/\t/ /; b
grab; }; s/\n/ /; s/\t/ /; p; Q; }' $MAILFILE1 | \
               awk 'BEGIN {FS=","} { for(n=1; n<=NF;n++){ match($n,
/((<)([[:alnum:]|[:punct:]]+@[[:alnum:]|[:punct:]]+)(\>)\s*)+/, arg);
printf " "arg[3]; }}'`
ISRECEIPT=`echo "$TO_ADDRS" | egrep -i
"$TEMPLATE$DOMAIN|$TEMPLATE$DOMAIN2"`
# if this is a read receipt, then replace the read receipt address with
the correct
# one from the database.  we know it is a read receipt by the email
address
# it is being sent to.  the address is composed of the record id of the
account for the
# read receipt followed by text ".readreceipt@usmailreceipts.com" like so:

#         012501c3bdbed85bf90bash800a8c0.readreceipt@hypership.com

if [ "$ISRECEIPT" ]; then
      # called from remote smtp server
      FROM_ADDR="$1"
      TO_ADDR=`echo "$2" | awk '{ match($0,
/([[:alnum:]|[:punct:]]+)(@[[:alnum:]|[:punct:]]+)/, arg); print arg[1];
}'`
      USER_ID=`echo "$TO_ADDRS" | awk '{ match($0,
/([[:alnum:]|[:punct:]]+)(@[[:alnum:]|[:punct:]]+)/, arg); print arg[1];
}'`
      #get the subject and date from the message.
      SUBJECT=`egrep -m 1 -i "Subject:" $MAILFILE1 | awk '{for (n=2;
n<=NF; n++) printf $n" " }'`
      MSGDATE=`egrep -m 1 -i "Date:" $MAILFILE1 | awk '{for (n=2; n<=NF;
n++) printf $n" " }'`
      # trim the recipient string.
```

#READRECIPIENT=`echo $TO_ADDRS | awk '{print $1}`'

```
      #USER_ID=`awk -v str="$READRECIPIENT" -v pat="@" 'BEGIN {
split(str,a,pat); print a[1]; }'`
      # extract the mail id from the "to" address in order to obtain the
mail id of the previous mail
      # that came through indicating it was requesting a read receipt.
      MAILID=`egrep -m 1 -i "Message-ID:" $MAILFILE1 | awk '{ print $2 }'
| awk '{ match($0, /\<(.*)\>/, arg); print arg[0] }'`
      # for a received read receipt, query the record for the mail id
found in the email.
      QRESULT=`psql -t -A -F "    " -h 127.0.0.1 -U filter -d postmarks -c
\
                      "select r.email_addr as from_addr,
coalesce(d.curr_count,0) as curr_usage, c.max_usage, r.acct_fkey,
r.relay_pkey, \
```

```
                        c.mail_id from tblReadReceiptInfo as c left outer
join (select a.orig_id, count(issue_pkey) as curr_count \
                        from tblPostmarkedReceipt as a, tblReadReceiptInfo
as b where a.orig_id=b.mail_id group by a.orig_id) as d
                        on c.mail_id=d.orig_id, tblPostmarkedEmail as e,
tblRelayAccount as r where c.mail_id=e.mail_id and
e.relay_fkey=r.relay_pkey \
                        and destination='$USER_ID';"`
        # check the query results.
        if [ "$QRESULT" ]; then
                EMAILADDR=`echo "$QRESULT" | awk '{print $1}'`
                CURR_USAGE=`echo "$QRESULT" | awk '{print $2}'`
                MAX_USAGE=`echo "$QRESULT" | awk '{print $3}'`
                ACCT_FK=`echo "$QRESULT" | awk '{print $4}'`
                RELAY_FK=`echo "$QRESULT" | awk '{print $5}'`
                ORIG_MAILID=`echo "$QRESULT" | awk '{print $6}'`
                if [ "$CURR_USAGE" -lt "$MAX_USAGE" ]; then
                        #create the postmark for the read receipt.
                        POSTMARKID=`$JAVA_HOME/bin/java -classpath "$CLASSPATH"
com.hyperspace.webreceipt.smtp.PostmarkFile \
                                        $POSTMARK_HOME/conf $AUTHENTIDATE_USER
$AUTHENTIDATE_PWD $MAILFILE1 $POSTMARKFILE | awk '{ print $2 }'`
                        if [ -z "$POSTMARKID" ]; then
                                echo Message content rejected. Postmark
unavailable.
                                exit $EX_UNAVAILABLE
                        fi
                        # create the read receipt.
                        echo "This is an Official USPS Postmarked Read Receipt:"
> $WORKINGFILE
                        echo "    Message Date: $MSGDATE" >> $WORKINGFILE
                        echo "    Original Mail ID: $ORIG_MAILID" >>
$WORKINGFILE
                        echo "    Postmark Serial: $POSTMARKID" >> $WORKINGFILE
                        echo "    Sender: $FROM_ADDR" >> $WORKINGFILE
                        echo "    Subject: $SUBJECT" >> $WORKINGFILE $MAILCLIENT -F $MAILCLIENTCONF -a $MAILFILE1 -a
$POSTMARKFILE -s "USPS Postmarked Read Receipt: $SUBJECT" $EMAILADDR <
$WORKINGFILE
                        # update the database to indicate that it was returned.
                        let CURR_USAGE=$CURR_USAGE+1
                        # insert the issued postmark receipt record into the
database for the read receipt being returned.
                        psql -t -A -F "    " -h 127.0.0.1 -U filter -d postmarks
-c \
                                "insert into tblPostmarkedReceipt
(relay_fkey,from_addr, orig_id,mail_id) values
('$RELAY_FK','$FROM_ADDR','$ORIG_MAILID','$MAILID');"
                        psql -t -A -F "    " -h 127.0.0.1 -U filter -d postmarks
-c "insert into tblPostmarksIssued (mail_id,receipt_sn) values
('$MAILID','$POSTMARKID');"

# delete the temporary access record if all of the read
receipts have been sent as seen by the count.
                        if [ "$CURR_USAGE" -eq "$MAX_USAGE" ]; then
```

```
                    psql -t -A -F "    " -h 127.0.0.1 -U filter -d
postmarks -c "delete from tblTempReceiptDestinations where
destination='$USER_ID';"

fi
        else
            echo "Too many read receipts issued."
            exit $EX_NOPERM;
        fi
    else
        echo "No read receipt records found."
        exit $EX_NOPERM;
    fi
    exit 0
# account relay email.
else
    # called from a verified access username and password that has a
specific e-Mail address or domain used to find the account
```

*FROM_ADDR="$1"*

```
    #get the subject and date from the message.
    CC_ADDRS=`sed -n -e '/cc:/I,/:/{ :grab; /,$/{; N; s/\n/ /; s/\t/ /;
b grab; }; s/\n/ /; s/\t/ /; p; Q; }' $MAILFILE1 | \
              awk 'BEGIN {FS=","} { for(n=1; n<=NF;n++){
match($n, /((<)([[:alnum:]|[:punct:]]+@[[:alnum:]|[:punct:]]+)(\>)\s*)+/,
arg); printf " "arg[3]; }}'`
    BCC_ADDRS=`sed -n -e '/Bcc:/I,/:/{ :grab; /,$/{; N; s/\n/ /; s/\t/
/; b grab; }; s/\n/ /;   s/\t/ /; p; Q; }' $MAILFILE1 | \
              awk 'BEGIN {FS=","} { for(n=1; n<=NF;n++){
match($n, /((<)([[:alnum:]|[:punct:]]+@[[:alnum:]|[:punct:]]+)(\>)\s*)+/,
arg); printf " "arg[3]; }}'`
```

*RECIPIENTS="$TO_ADDRS $CC_ADDRS $BCC_ADDRS"*

```
    SUBJECT=`egrep -m 1 -i "Subject:" $MAILFILE1 | awk '{for (n=2;
n<=NF; n++) printf $n" " }'`
    MSGDATE=`egrep -m 1 -i "Date:" $MAILFILE1 | awk '{for (n=2; n<=NF;
n++) printf $n" " }'`
    # get the mail id from the mail.
    MAILID=`egrep -m 1 -i "Message-ID:" $MAILFILE1 | awk '{ print $2 }'
| awk '{ match($0, /\<(.*)\>/, arg); print arg[0] }'`
    # get the account id and relay user key from the database using the
e-Mail address used as the from address.
    QRESULT=`psql -t -A -F "    " -h 127.0.0.1 -U filter -d postmarks -c
\
              "select b.acct_fkey, b.relay_pkey from tblRelayAccount
as b where b.email_addr='$FROM_ADDR';"`
    # check the query results.
    if [ -z "$QRESULT" ]; then
        echo "Access Denied.  e-Mail address not registered with
account $FROM_ADDR"
        exit $EX_NOPERM
    fi
    ACCT_FK=`echo "$QRESULT" | awk '{print $1}'`
    RELAY_FK=`echo "$QRESULT" | awk '{print $2}'`
    # check to see if a read receipt is requested.
```

```
        REQUESTRECEIPT=`egrep -i "$READRECEIPTINDICATORS" $MAILFILE1`
        # do extra work if the receipt is requesting a return receipt.
        if [ "$REQUESTRECEIPT" ]; then
                REQUESTRECEIPTBY=`echo "$REQUESTRECEIPT" | awk '{ match($0,
/\w+([[:punct:]]\w+)*\@\w+\.\w+(\.\w+)*/, arg); print arg[0] }'`
                UUID=`uuidgen`
                TEMPACCT=`echo $UUID$TEMPLATE`
                NUM_RCPTS=`echo "$@" | awk '{ print NF-1; }'`
                # if the relayed email is requesting a read receipt, insert a
record that indicates the number of expected replies.
                psql -t -A -F "    " -h 127.0.0.1 -U filter -d postmarks -c
"insert into tblReadReceiptInfo (destination,mail_id,max_usage) \
                        values ('$TEMPACCT','$MAILID',$NUM_RCPTS);"

# insert a temporary user name into the database in order to
handle the returned read receipt.
                psql -t -A -F "    " -h 127.0.0.1 -U filter -d postmarks -c
"insert into tblTempReceiptDestinations (destination,acct_fkey) \
                        values ('$TEMPACCT', $ACCT_FK);"

# replace the return receipt reply to address with the new
account id.
                REPLACEMENTEMAIL=`echo $REQUESTRECEIPT | sed
s/"$REQUESTRECEIPTBY"/"$TEMPACCT$DOMAIN"/`
                sed s/"$REQUESTRECEIPT"/"$REPLACEMENTEMAIL"/ "$MAILFILE1" >
"$MAILFILE2"
        else
                # reset the variable to point to the file the data is held
within.
```

MAILFILE2="$MAILFILE1"

```
        fi
        POSTMARKID=`$JAVA_HOME/bin/java -classpath "$CLASSPATH"
com.hyperspace.webreceipt.smtp.PostmarkFile \
                        $POSTMARK_HOME/conf $AUTHENTIDATE_USER
$AUTHENTIDATE_PWD $MAILFILE2 $POSTMARKFILE | awk '{ print $2 }'`
        if [ -z "$POSTMARKID" ]; then
                echo Message content rejected
                exit $EX_UNAVAILABLE
        fi
        echo "This is an Official USPS Postmarked Mailing Receipt for the
following email:" > $WORKINGFILE
        echo "    Message Date: $MSGDATE" >> $WORKINGFILE
        echo "    Message Id: $MAILID" >> $WORKINGFILE
        echo "    Postmark Serial: $POSTMARKID" >> $WORKINGFILE
        echo "    Sender: $FROM_ADDR" >> $WORKINGFILE
        echo "    Recipients: $TO_ADDRS" >> $WORKINGFILE
        echo "    Subject: $SUBJECT" >> $WORKINGFILE $MAILCLIENT -F $MAILCLIENTCONF -a $POSTMARKFILE -s "Mailing Receipt"
"$@" < $WORKINGFILE
        $SENDMAIL "-f $@" < $MAILFILE2
        # insert the record indicating that we issued a postmark for the e-
Mail that was relayed.
        psql -t -A -F "    " -h 127.0.0.1 -U filter -d postmarks -c "insert
into tblPostmarkedEmail (relay_fkey,to_addr,\
```

```
                        mail_id) values ($RELAY_FK,'$RECIPIENTS','$MAILID');"
        psql -t -A -F "    " -h 127.0.0.1 -U filter -d postmarks -c "insert
into tblPostmarksIssued (mail_id,receipt_sn) values
('$MAILID','$POSTMARKID');"

exit 0
fi
exit $?
```

What is claimed is:

1. A method for processing an electronic mail message ("email"), comprising:
   receiving, at a computing device, the email, the email being transmitted from an electronic device;
   generating, by the computing device, a transaction record relevant to a specific class of service of the email based upon details of a transaction associated with the email;
   receiving, by the computing device, an electronic postmark, the electronic postmark configured to authenticate the transaction record resulting in an authenticated transaction record;
   adding, by the computing device, a unique identifier of the electronic postmark to the email;
   transmitting the email, including the unique identifier, from the computing device;
   transmitting the authenticated transaction record from the computing device to the electronic device, the authenticated transaction record being transmitted to confirm the delivery of the email, including a confirmation of restricted delivery of the email to an addressee, the delivery of the email to the addressee configured to provide a notification of the email via a notice;
   receiving, by the computing device, the digitally signed notice via an electronic universal reference locator-type link in the notice; and
   delivering, by the computing device, a key to the addressee, the key configured to facilitate opening of the email.

2. The method of claim 1, further comprising:
   receiving, at the computing device, the authenticated transaction record or the unique identifier;
   submitting the received authenticated transaction record or the unique identifier to a verifier device; and
   receiving details of a verification of the authenticated transaction record or the unique identifier from the verifier device.

3. The method of claim 1, further comprising:
   selectively accepting the email at a recipient device according to a presence of the unique identifier.

4. The method of claim 1, wherein an identity associated with the mailer device is verified by one of a postal authority and an agent of the postal authority.

5. The method of claim 1, wherein the unique identifier is the electronic postmark.

6. The method of claim 1, wherein the unique identifier is a serial number of the electronic postmark.

7. The method of claim 1, wherein the unique identifier is a graphical image in which the electronic postmark is embedded using stegonography.

8. The method of claim 1, wherein the transaction record is a certificate of mailing attesting to delivery of the email to an email server unassociated with the mailer device.

9. The method of claim 1, wherein the transaction record is a certificate of delivery attesting to delivery of the email to an email server associated with the recipient device.

10. The method of claim 1, wherein said adding the unique identifier to the email includes:
    embedding the authenticated transaction record into the email.

11. The method of claim 1, further comprising:
    sending the authenticated transaction record in conjunction with the email to another recipient device.

12. The method of claim 1, further comprising:
    electronically signing by the computing device the email using a digital certificate.

13. The method of claim 1, wherein said adding the unique identifier to the email is performed by mail filter invoked from a simple mail transfer protocol (SMTP) mail server.

14. The method of claim 1, wherein said adding the unique identifier to the email includes:
    embedding the unique identifier into multiple emails.

15. The method of claim 14, further comprising:
    sending the email, including the unique identifier, from the computing device to multiple recipient devices.

16. The method of claim 1, further comprising:
    generating, by the computing device, a waybill that includes a listing of multiple emails to be delivered to the recipient device; and
    sending, from the computing device to the recipient device, the waybill before the sending of the email from the computing device to the recipient device.

17. The method of claim 1, wherein the electronic device is a mailer simple mail transfer protocol (SMTP) mail terminal server.

18. A system for processing an electronic mail message ("email"), comprising:
    a memory device to store instructions; and
    a processor to execute the instructions stored in the memory device to:
      receive an email that was transmitted from an electronic device;
      create a transaction record associated with a class of service of the email based upon details of a transaction associated with the email;
      receive an electronic postmark to authenticate the transaction record;
      add a unique identifier of the electronic postmark to the email, the electronic postmark configured to authenticate the transaction record resulting an authenticated record;
      transmit the email including the unique identifier; and
      transmit the authenticated transaction record to the electronic device, the authenticated transaction record being transmitted to confirm the to delivery of the email, including a confirmation of restricted delivery of the email to an addressee, the delivery of the email to the addressee configured to provide a notification of the email via a notice, the notice configured to receive a digital signature from the addressee resulting in a digitally signed notice;
      receive the digitally signed notice via an electronic universal reference locator-type link included in the notice; and
      deliver a key to the addressee, the key configured to facilitate opening the email.

19. The system of claim 18, wherein the processor executes the instructions stored in the memory device further to:
    receive the authenticated transaction record or the unique identifier;
    submit the received authenticated transaction record or the unique identifier to a verifier device; and
    receive details of a verification of the authenticated transaction record or the unique identifier from the verifier device.

20. The system of claim 18, wherein a recipient device is configured to selectively accept the email at the recipient device according to a presence of the unique identifier.

21. The system of claim 18, wherein an identity associated with the electronic device is verified by one of a postal authority or an agent of the postal authority.

22. The system of claim 18, wherein the unique identifier is the electronic postmark.

23. The system of claim 18, wherein the unique identifier is a serial number of the electronic postmark.

24. The system of claim 18, wherein the unique identifier is a graphical image in which the electronic postmark is embedded using stegonography.

25. The system of claim 18, wherein the transaction record is a certificate of mailing attesting to delivery of the email to an email server unassociated with the electronic device.

26. The system of claim 18, wherein the transaction record is a certificate of delivery attesting to delivery of the email to an email server associated with a recipient device.

27. The system of claim 18, wherein the processor executes the instructions stored in the memory device further to:
embed the authenticated transaction record into the email.

28. The system of claim 18, wherein the processor executes the instructions stored in the memory device further to:
transmit the authenticated transaction record in conjunction with the email to a recipient device.

29. The system of claim 18, wherein the processor executes the instructions stored in the memory device further to:
electronically sign the email using a digital certificate.

30. The system of claim 18, wherein the processor executes the instructions stored in the memory device further to add the unique identifier to the email by invoking a simple mail transfer protocol (SMTP) mail server.

31. The system of claim 18, wherein the processor executes the instructions stored in the memory device further to add the unique identifier to the email by embedding the unique identifier into multiple emails.

32. The system of claim 31, wherein the processor executes the instructions stored in the memory device further to:
send the email, including the unique identifier, from the computing device to multiple recipient devices.

33. The system of claim 18, wherein the processor executes the instructions stored in the memory device further to:
generate a waybill that includes a listing of multiple emails to be delivered to a recipient device;
transmit, to the recipient device, the waybill before transmitting the email from the computing device to the recipient device.

34. A non-transitory computer-readable storage medium storing instruction which cause a computing device to perform operations, comprising:
receiving, at the computing device, an email that was transmitted from an electronic device
creating a transaction record relevant to a specific class of service of the email based upon details of a transaction associated with the email;
receiving, by the computing device, an electronic postmark, the electronic postmark to authenticate the transaction record resulting in an authenticated transaction record;
adding, by the computing device, a unique identifier of the electronic postmark to the email; and
transmitting the email, including the unique identifier from the computing device; and
transmitting the authenticated transaction record from the computing device to the electronic device, the authenticated transaction record being transmitted to confirm the delivery of the email, including a confirmation of restricted delivery of the email to an addressee, the delivery of the email to the addressee configured to provide a notification of the email via a notice, the notice configured to receive a digital signature from the addressee resulting in a digitally signed notice;
receiving, by the computing device, the digitally signed notice via an electronic universal reference locator-type link in the notice; and
delivering, by the computing device, a key to the addressee, the key to facilitate opening of the email.

35. The non-transitory computer-readable storage medium of claim 34, wherein the operations further comprise:
receiving, at the computing device, the authenticated transaction record or the unique identifier;
submitting the received authenticated transaction record or the unique identifier to a verifier device; and
receiving details of a verification of the authenticated transaction record or the unique identifier from the verifier device.

36. The non-transitory computer-readable storage medium of claim 34, wherein the operations further comprise:
selectively accepting the email at a recipient device according to a presence of the unique identifier.

37. The non-transitory computer-readable storage medium of claim 34, wherein an identity associated with the electronic device is verified by one of a postal authority or an agent of the postal authority.

38. The non-transitory computer-readable storage medium of claim 34, wherein the unique identifier is the electronic postmark.

39. The non-transitory computer-readable storage medium of claim 34, wherein the unique identifier is a serial number of the electronic postmark.

40. The non-transitory computer-readable storage medium of claim 34, wherein the unique identifier is a graphical image in which the electronic postmark is embedded using stegonography.

41. The non-transitory computer-readable storage medium of claim 34, wherein the transaction record is a certificate of mailing attesting to delivery of the email to an email server unassociated with the electronic device.

42. The non-transitory computer-readable storage medium of claim 34, wherein the transaction record is a certificate of delivery attesting to delivery of the email to an email server associated with a recipient device.

43. The non-transitory computer-readable storage medium of claim 34, wherein the adding the unique identifier to the email includes:
embedding the authenticated transaction record into the email.

44. The non-transitory computer-readable storage medium of claim 34, wherein the operations further comprise:
transmitting the email, including the unique identifier, from the computing device to multiple recipient devices.

45. The non-transitory computer-readable storage medium of claim 34, wherein the operations further comprise:
electronically signing by the computing device the email using a digital certificate.

46. The non-transitory computer-readable storage medium of claim 34, wherein the operations further comprise:

invoking a mail filter as a simple mail transport protocol (SMTP) mail server application.

47. The non-transitory computer-readable storage medium of claim 34, wherein the adding the unique identifier to the email includes:
embedding the unique identifier into multiple emails.

48. The non-transitory computer-readable storage medium of claim 47, wherein the operations further comprise:
transmitting the email, including the unique identifier, from the computing device to multiple recipient devices.

49. The non-transitory computer-readable storage medium of claim 34, wherein the operations further comprise:
generating, by the computing device, a waybill that includes a listing of multiple emails to be delivered to a recipient device;
sending, from the computing device to the recipient device, the waybill before transmitting the email from the computing device to the recipient device.

* * * * *